United States Patent
Lee et al.

(10) Patent No.: US 11,604,014 B2
(45) Date of Patent: Mar. 14, 2023

(54) ELECTRIC MOTOR AND COMPRESSOR HAVING THE SAME

(71) Applicant: LG Electronics Inc., Seoul (KR)

(72) Inventors: Injae Lee, Seoul (KR); Sangjoon Eum, Seoul (KR); Jeonghwan Kim, Seoul (KR); Mingyu Kim, Seoul (KR); Heedon Jung, Seoul (KR)

(73) Assignee: LG Electronics Inc., Seoul (KR)

(*) Notice: Subject to any disclaimer, the term of this patent is extended or adjusted under 35 U.S.C. 154(b) by 222 days.

(21) Appl. No.: 17/060,705

(22) Filed: Oct. 1, 2020

(65) Prior Publication Data

US 2021/0222922 A1   Jul. 22, 2021

(30) Foreign Application Priority Data

Jan. 22, 2020 (KR) .......... 10-2020-0008856

(51) Int. Cl.
*H02K 1/26* (2006.01)
*F25B 31/02* (2006.01)
*H02K 1/276* (2022.01)

(52) U.S. Cl.
CPC ........... *F25B 31/026* (2013.01); *H02K 1/26* (2013.01); *H02K 1/2766* (2013.01); *F25B 2400/07* (2013.01)

(58) Field of Classification Search
CPC ........ F25B 31/00; F25B 31/02; F25B 31/026; H02K 1/26; H02K 1/27
See application file for complete search history.

(56) References Cited

U.S. PATENT DOCUMENTS 6,147,428 A * 11/2000 Takezawa ............... H02K 7/14
                                                    310/156.57
7,151,335 B2 * 12/2006 Tajima .................... B60L 50/66
                                                    310/156.56
(Continued)

FOREIGN PATENT DOCUMENTS

CN   208241436   12/2018
JP   H09131009    5/1997
(Continued)

OTHER PUBLICATIONS

Notice of Allowance in Korean Appln. No. 10-2020-0008856, dated Jan. 3, 2022, 7 pages (with English translation).
(Continued)

*Primary Examiner* — Tran N Nguyen
(74) *Attorney, Agent, or Firm* — Fish & Richardson P.C.

(57) ABSTRACT

The present disclosure relates to an electric motor, and a compressor having the same. The electric motor includes a stator, and a rotor. The rotor includes a rotation shaft, a rotor core, and a plurality of permanent magnets. The rotor core includes permanent magnet insertion portions each formed therethrough in an axial direction so that the permanent magnet is inserted, and slots each formed through the rotor core in a manner that a core area of a front portion of a d-axis is smaller than a core area of a rear portion of the d-axis in a rotating direction of the rotor when an outer core part of the permanent magnet insertion portion is divided with respect to the d-axis. Accordingly, a decrease in inertia can be suppressed and an occurrence of vibration and noise due to Magnetic Pull Force (MPF) can be prevented.

19 Claims, 18 Drawing Sheets

(56) References Cited

U.S. PATENT DOCUMENTS

| | | | |
|---|---|---|---|
| 8,018,109 B2* | 9/2011 | Leonardi | B60L 7/14 |
| | | | 310/156.53 |
| 2015/0069874 A1* | 3/2015 | Iki | H02K 1/274 |
| | | | 310/156.11 |

FOREIGN PATENT DOCUMENTS

| | | | | |
|---|---|---|---|---|
| JP | H10285851 | | 10/1998 | |
| JP | 3906883 | * | 4/2007 | H02K 1/276 |
| JP | 2008199790 | | 8/2008 | |
| JP | 2009050153 | | 3/2009 | |
| JP | 2014226008 | | 12/2014 | |
| KR | 100711363 | | 4/2007 | |
| KR | 20130062872 | | 6/2013 | |
| KR | 20150059974 | | 6/2015 | |
| WO | WO2012141085 | * | 10/2012 | H02K 1/2766 |

OTHER PUBLICATIONS

KR Office Action in Korean Appln. No. 10-2020-0008856, dated Jun. 24, 2021, 10 pages (with English translation).

* cited by examiner

ELECTRIC MOTOR AND COMPRESSOR HAVING THE SAME

CROSS-REFERENCE TO RELATED APPLICATION

Pursuant to 35 U.S.C. § 119(a), this application claims the benefit of the earlier filing date and the right of priority to Korean Patent Application No. 10-2020-0008856, filed on Jan. 22, 2020, the contents of which is incorporated by reference herein in its entirety.

BACKGROUND

1. Technical Field

The present disclosure relates to an electric motor, and a compressor having the same.

2. Description of the Related Art

As is well known, an electric motor is an apparatus that converts electric energy into mechanical energy.

Such an electric motor includes a stator and a rotor rotatably disposed in the stator with a predetermined air gap from the stator.

Electric motors are also classified into a direct-current (DC) motor and an alternating-current (AC) motor according to power used, and the AC motor is widely used because of its simple structure, small size, and light weight.

The AC motor is classified into a single-phase alternating current type and a three-phase alternating current type, and also classified into an induction motor, a synchronous motor, and a commutator motor according to a type of a rotor.

Meanwhile, in some of the synchronous motors, the rotor is provided with permanent magnets. The permanent magnet is coupled to an outer circumferential surface of the rotor or is inserted into the rotor in an axial direction.

However, in the related art electric motor having such permanent magnets, vibration and noise are problematically increased due to a Magnetic Pull Force (MPF) acting between the stator and a core disposed outside the permanent magnets of the rotor core.

In consideration of this problem, some related art electric motors are provided with a plurality of slits (holes) formed through a portion of the core outside the permanent magnets of the rotor core so as to reduce vibration and noise during operation.

However, in these related art electric motors, the slits (slots) are formed symmetrically with respect to a d-axis (i.e., a line connecting a center of a magnetic pole (N pole, S pole) and a center of the rotor). This structure has a limit to improving a magnetic flux distribution around the core at an outer side of the permanent magnet.

In addition, due to the structure of the related art electric motors, in which the plurality of slits is formed on both sides with respect to the d-axis, the inertia of the rotor decreases, thereby increasing vibration and noise during low speed rotation.

The structure of the related art electric motors, in which the plurality of slits is formed on both sides with respect to the d-axis, also causes an increase in pressure (current) during the low speed rotation, thereby decreasing operation efficiency.

PRIOR ART LITERATURES

Patent Literatures (Patent Literature 1) CN2082441436 U
(Patent Literature 2) KR10-0711363 B1
(Patent Literature 3) JP11-187597 A

SUMMARY

Therefore, one aspect of the present disclosure is to provide an electric motor capable of suppressing a decrease in inertia and preventing an occurrence of vibration and noise caused by a Magnetic Pull Force (MPF), and a compressor having the same.

Another aspect of the present disclosure is to provide an electric motor capable of suppressing an increase in pressure during low speed rotation and improving operation efficiency, and a compressor having the same.

Another aspect of the present disclosure is to provide an electric motor capable of decreasing vibration and noise caused by an MPF of a rotor rotating in one direction and improving operation efficiency, and a compressor having the same.

To achieve the above aspects and other advantages of the present disclosure, there is provided an electric motor that may be configured such that an area of a front portion of a d-axis is smaller than an area of a rear portion of the d-axis when an outer core part of a permanent magnet of a rotor core is divided into the front portion and the rear portion with respect to the d-axis along a rotating direction of a rotor.

Specifically, when a permanent magnet insertion portion is formed through the rotor core in an axial direction and an outer core part of the permanent magnet insertion portion is divided into a front portion and a rear portion with respect to a d-axis, a slot may be formed through the rotor core in a manner that a core area of the front portion of the d-axis is smaller than a core area of the rear portion of the d-axis along a rotating direction of the rotor core, which may result in suppressing a decrease in inertia and preventing vibration and noise due to MPF.

The electric motor may include a stator, and a rotor disposed in the stator with a preset air gap from the stator to be rotatable in one direction. The rotor may include a rotation shaft, a rotor core coupled to the rotation shaft, and a plurality of permanent magnets coupled to the rotor core in an axial direction and arranged to form different magnetic poles along a circumferential direction. The rotor core may include a plurality of permanent magnet insertion portions each formed therethrough in the axial direction so that the plurality of permanent magnets is inserted, respectively, and at least one slot formed through the rotor core in a manner that a core area of a front portion of a d-axis is smaller than a core area of a rear portion of the d-axis along a rotating direction of the rotor when an outer core part of the permanent magnet insertion portion is divided with respect to the d-axis.

The rotor may be provided with two permanent magnets per pole, and the two permanent magnets may include a first permanent magnet disposed in the front portion of the d-axis and a second permanent magnet disposed in the rear portion of the d-axis.

In one implementation, each of the plurality of permanent magnet insertion portions may include a first permanent magnet insertion portion into which the first permanent magnet is inserted, and a second permanent magnet insertion portion into which the second permanent magnet is inserted.

The at least one slot may be provided with a first side arranged in parallel at an outside of an outer side of the first permanent magnet insertion portion, and a second side extending from the first side to be in parallel with the outer side of the second permanent magnet insertion portion.

The at least one slot may further be provided with a third side arranged at an outside of the first side in parallel, and a fourth side arranged at an outside of the second side in parallel.

In one implementation, the third side may have a length shorter than a length of the first side, and the fourth side may have a length shorter than a length of the second side. The at least one slot may further be provided with a fifth side extending from the third side to be in parallel with the second side, and a sixth side extending from the fourth side to be in parallel with the first side and connected to the fifth side.

In one implementation, the slot may be provided with a third side extending from an end portion of the second side to be in parallel with the first side, and a connection section connecting the first side and the third side.

The first permanent magnet insertion portion may have a larger area than an area of the second permanent magnet insertion portion.

In one implementation, the first permanent magnet insertion portion may be provided with a first flux barrier extending along a lengthwise direction of the first permanent magnet. The second permanent magnet insertion portion may be provided with a second flux barrier extending along a lengthwise direction of the second permanent magnet. The first permanent magnet insertion portion may be provided with a first expansion slot expanded toward the d-axis.

In one implementation, the second permanent magnet insertion portion may be provided with a second expansion slot expanded toward the d-axis.

The first expansion slot may have a larger area than an area of the second expansion slot.

The first expansion slot may be provided with a first protruding portion protruding toward the d-axis by a preset first height, and a second protruding portion protruding at one side of the first protruding portion by a second height shorter than the first height.

The second expansion slot may have a lower protrusion height than the first expansion slot.

In one implementation, the slot may be provided with a front slot disposed in the front portion of the d-axis, and a rear slot disposed in the rear portion of the d-axis.

The front slot and the rear slot may be provided with a first side arranged in parallel with the outer side of the first permanent magnet insertion portion, and a second side extending from the first side to be in parallel with the outer side of the second permanent magnet insertion portion.

In one implementation, the front slot may be provided with a third side extending from an end portion of the second side to be in parallel with the first side, an arcuate section extending from an end portion of the first side to be in parallel with an outer circumference of the rotor core, and a connection section connecting the arcuate section and the third side.

The rear slot may be provided with a third side extending from an end portion of the second side to be in parallel with the first side, and a fourth side extending from the third side to be in parallel with the first side.

In one implementation, the slot may be further provided with a central slot formed over the front portion and the rear portion of the d-axis.

The central slot may be provided with a third side extending from an end portion of the first side to be in parallel with the second side, and a fourth side extending from an end portion of the second side to be in parallel with the first side and connected to the third side.

In one implementation, the front slot may be provided with a first front slot formed in the front portion of the d-axis, and a second front slot formed in an outer end region of the first permanent magnet.

The rear slot may be formed in an outer end region of the second permanent magnet.

In one implementation, the outer core part of the first permanent magnet insertion portion and the second permanent magnet insertion portion may be divided into the front portion of the d-axis and the rear portion of the d-axis with respect to the d-axis. The front portion of the d-axis may be divided into a d-axis front outer part and a d-axis front inner part by a division line passing vertically through the d-axis, and the rear portion of the d-axis may be divided into a d-axis rear inner part and a d-axis rear outer part by the division line passing vertically through the d-axis.

The slot may be configured such that a slot area of the d-axis front inner part is equal to or smaller than a slot area of the d-axis front outer part, a slot area of the d-axis rear inner part is equal to or smaller than a slot area of the d-axis front inner part, and a slot area of the d-axis rear outer part is equal to or smaller than a slot area of the d-axis rear inner part.

In accordance with another aspect of the present disclosure, there is provided a compressor which may include a case, a compression unit provided inside the case to compress a refrigerant, and the electric motor provided inside the case to apply driving force to the compression unit.

The compression unit may include a cylinder having an inner accommodation space, and a roller rotatably disposed in the cylinder and connected to the rotation shaft of the electric motor.

As described above, in accordance with one implementation, a slot can be formed through a rotor in an axial direction in a manner that a core area of a front portion of a d-axis is smaller than a core area of a rear portion of the d-axis in a rotating direction of the rotor, which may result in suppressing an occurrence of vibration and noise due to MPF and a decrease in inertia of the rotor due to the formation of the slot.

This may also result in suppressing a decrease in inertia which is caused due to a formation of a slot through an outer core (core) of a permanent magnet insertion portion of the rotor core for improving distribution of MPF formed between a stator and rotor. Accordingly, the inertia of the rotor core can increase relatively, thereby reducing an input during low speed rotation.

Therefore, operation efficiency of a compressor can be improved during the low speed rotation.

In addition, a slot formed in a front region of the d-axis and a slot formed in a rear region of the d-axis in a rotating direction of the rotor may be asymmetrical with each other, which may result in remarkably suppressing an occurrence of vibration and noise due to MPF of an electric motor appropriate for a uni-directional rotation.

DETAILED DESCRIPTION

Figure 1:
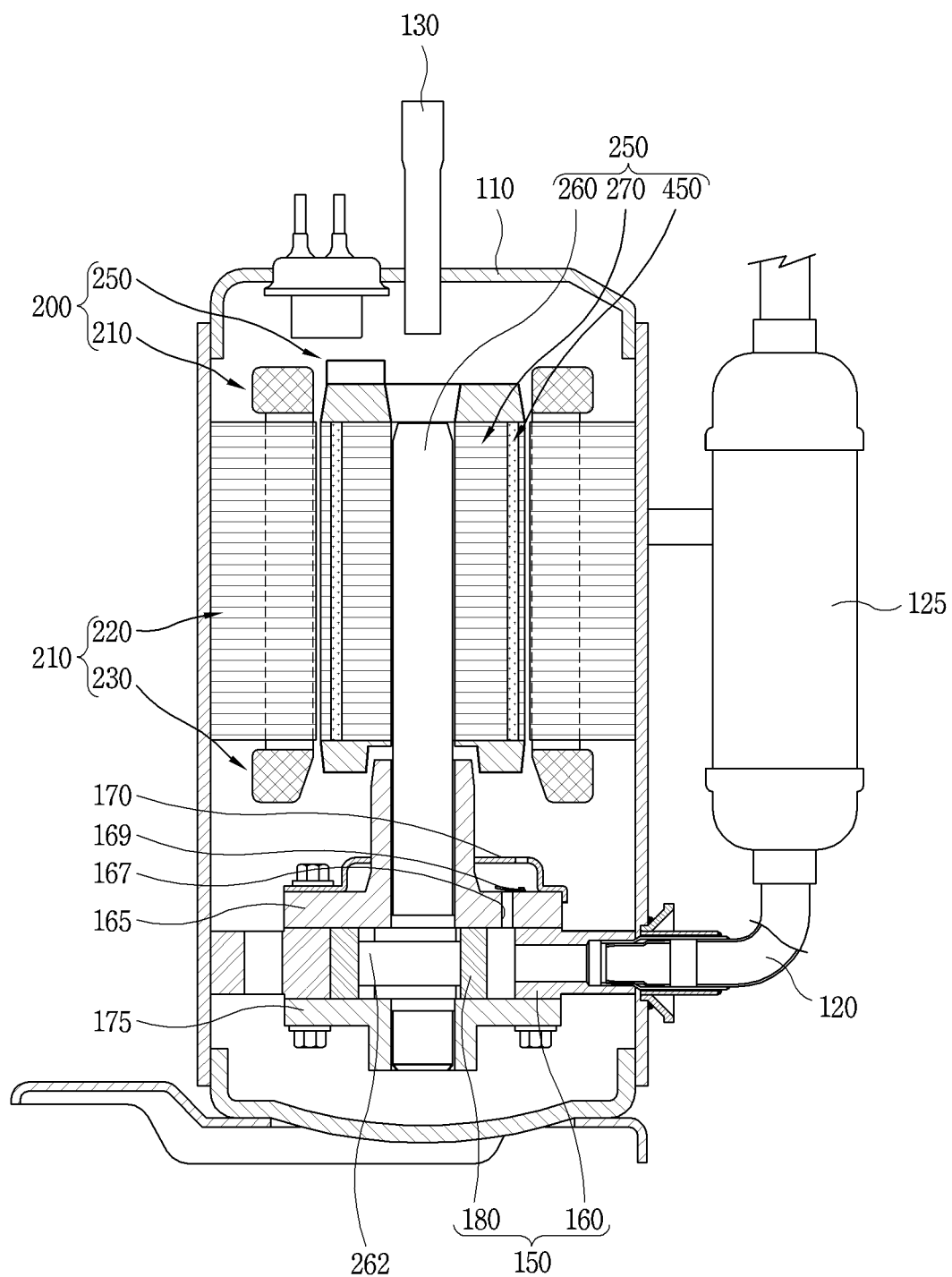
FIG. 1 is a sectional view of a compressor having an electric motor in accordance with one implementation.

Hereinafter, embodiments of the present disclosure will be described in detail with reference to the accompanying drawings. Herein, like reference numerals denote like elements even in different embodiments, and a description for an element appearing first will replace descriptions for like elements appearing later. As used herein, the singular forms "a," "an," and "the" are intended to include the plural forms as well unless the context clearly indicates otherwise. In describing embodiments disclosed in the specification, moreover, the detailed description will be omitted when a specific description for publicly known technologies to which the invention pertains is judged to obscure the gist of the embodiments disclosed in the specification. Also, it should be noted that the accompanying drawings are merely illustrated to easily understand the embodiments disclosed in the specification, and therefore, they should not be construed to limit the technical spirit disclosed in the specification.

FIG. 1 is a sectional view of a compressor having an electric motor in accordance with one implementation. As illustrated in FIG. 1, a compressor having an electric motor according to this implementation may include a case 110, a compression unit 150, and an electric motor 200.

The case 110 may have an accommodation space formed therein. The case 110 may be configured to form a sealed accommodation space therein. The compression unit 150 may be provided at one side (a lower side in the drawing) inside the case 110.

The compression unit 150, for example, may include a cylinder 160, and a roller 180 rotatably disposed inside the cylinder 160. Although not illustrated in detail, the cylinder 160 may also be provided therein with a vane brought into contact with the roller 180 to perform a relative motion, in addition to the roller 180 rotatably disposed therein. The roller 180 may be connected to a rotation shaft 260 of the electric motor 200. Accordingly, the roller 180 may rotate inside the cylinder 160 centering on the rotation shaft 260.

The cylinder 160 may be configured to be open on both upper and lower sides thereof in the drawing, for example.

An upper bearing 165 may be provided on an upper side of the cylinder 160. A lower bearing 175 may be provided on a lower side of the cylinder 160. The upper bearing 165 and the lower bearing 175 may be coupled to block the upper and lower sides of the cylinder 160, respectively. The upper bearing 165 and the lower bearing 175 may rotatably support the rotation shaft 260 of the electric motor 200 accommodated therein. A discharge port 167 through which a compressed refrigerant is discharged may be formed through the upper bearing 165. The upper bearing 165 may be provided with a discharge valve 169 for opening and closing the discharge port 167. A discharge cover 170 may be provided on the upper bearing 165.

A suction pipe 120 through which a refrigerant is introduced may communicate with one side (a right side in the drawing) of the cylinder 160. The suction pipe 120 may extend externally through the case 110. A discharge pipe 130 through which a refrigerant is discharged may be provided through an upper side of the case 110. The discharge pipe 130 may extend upwardly. The suction pipe 120, for example, may communicate with an accumulator 125. As is well known, the accumulator 125 may be configured such that a refrigerant filled therein is separated into a gaseous refrigerant and a liquid refrigerant by a specific gravity difference.

Meanwhile, the electric motor 200 may be provided above the compression unit 150 inside the case 110. The electric motor 200, for example, may include a stator 210, and a rotor 250 rotatably disposed in the stator 210 with a preset gap G from the stator 210.

The stator 210 may include, for example, a stator core 220 fitted in the case 110, and a stator coil 230 wound around the stator core 220.

The rotor 250 may include, for example, a rotation shaft 260, a rotor core 270 coupled to the rotation shaft 260, and a plurality of permanent magnets 450 coupled to the rotor core 270.

The electric motor 200 of this implementation may be configured to rotate in one direction (counterclockwise in the drawing) along a circumferential direction of the rotor 250 (the stator 210), for example.

The rotation shaft 260 may extend to both sides of the rotor core 270. A lower region of the rotation shaft 260 may be rotatably supported by the upper bearing 165 and the lower bearing 175.

An eccentric portion 262 may be formed at the lower region of the rotation shaft 260. The eccentric portion 262 may be disposed within the cylinder 160. The eccentric portion 262 may be coupled with the roller 180. When the rotation shaft 260 rotates, the roller 180 may rotate (eccentrically move) centering on the rotation shaft 260 inside the cylinder 160. Accordingly, a refrigerant introduced into the cylinder 160 through the suction pipe 120 may be compressed and then discharged to the outside of the cylinder 160 through the discharge port 167.

Figure 2:
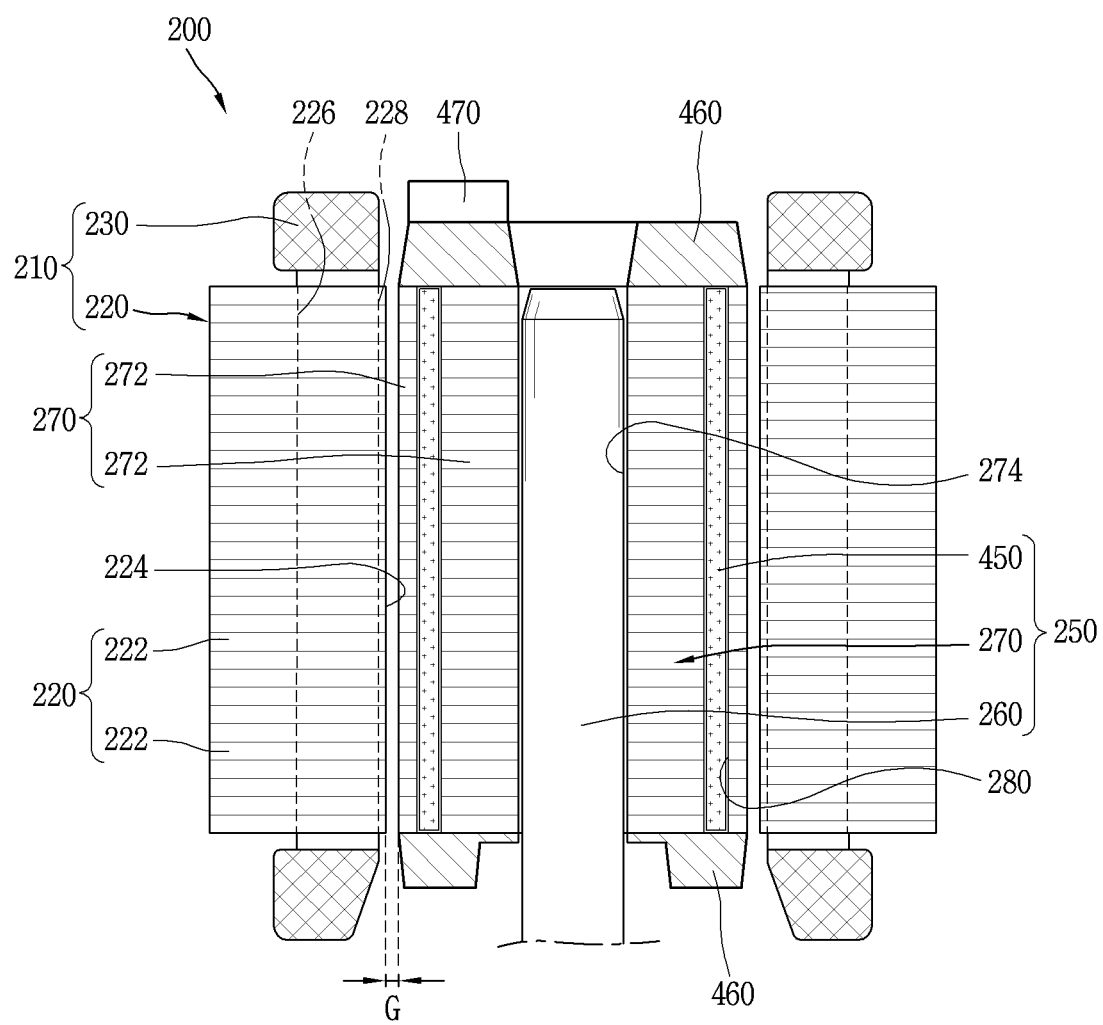
FIG. 2 is an enlarged view of the electric motor of FIG. 1.
Figure 3:
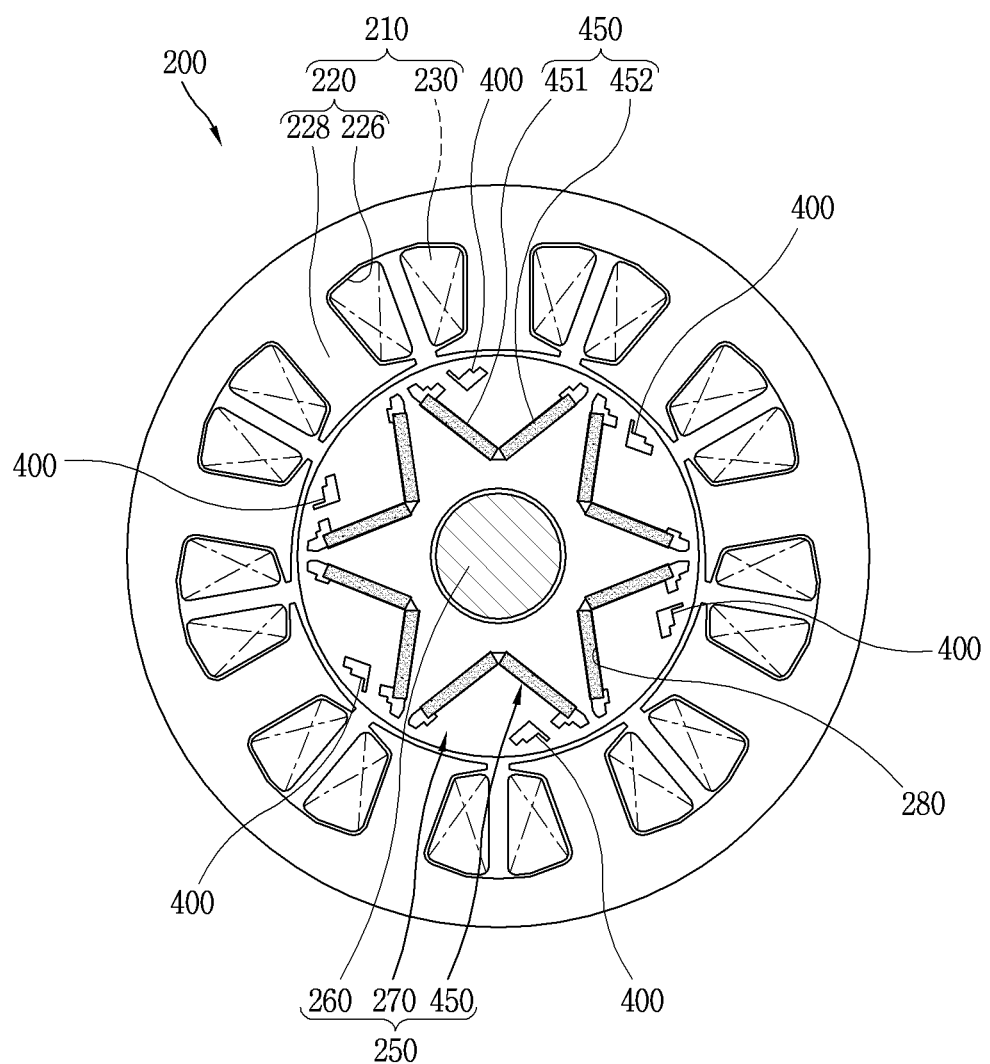
FIG. 3 is a horizontal sectional view of the electric motor of FIG. 2.

FIG. 2 is an enlarged view of the electric motor of FIG. 1, and FIG. 3 is a horizontal sectional view of the electric motor of FIG. 2. As illustrated in FIGS. 2 and 3, a rotor accommodation opening 224 may be formed in the stator core 220 so that the rotor 250 may be rotatably accommodated. The stator core 220 may be formed by stacking a plurality of electrical sheets 222 in an insulating manner. The rotor accommodation opening 224 may be formed through the stator core 220 in the axial direction. The stator core 220 may be provided with a plurality of slots 226 and teeth 228 alternately formed on a circumference of the rotor accommodation opening 224. The implementation illustrates that the slots 226 and the teeth 228 are each provided by nine in number, but this is merely illustrative. The number may be appropriately adjusted. The stator coil 230 may be configured to be connected in a preset pattern via the slots 226.

The rotor 250 may be provided with a plurality of permanent magnets 450 forming different magnetic poles (N pole and S pole) along the circumferential direction. The rotor 250 may have six poles along the circumferential direction, for example. Three teeth 228 of the stator core 220 may be disposed correspondingly per two poles of the rotor 250.

The permanent magnet 450, for example, may be formed in a shape with a rectangular cross section. The permanent magnet 450 may be coupled to the rotor core 270 along the axial direction. The permanent magnet 450 may be formed thin in a rectangular parallelpiped shape, for example.

The rotor core 270 may be formed by stacking a plurality of electrical sheets 272 in an insulating manner. A rotation shaft opening 274 in which the rotation shaft 260 is inserted may be formed through a center of the rotor core 270. Permanent magnet insertion portions 280 through which the permanent magnets 450 are inserted may be formed through the rotor core 270 in the axial direction.

End plates 460 for blocking the permanent magnet insertion portions 280 may be provided on both ends of the rotor core 270, respectively. This may result in preventing separation of the permanent magnets 450 in the axial direction. The rotor core 270 may be provided with a balance weight 470 that generates an unbalanced force in one direction during rotation. The balance weight 460 may be coupled to an outer side of the end plate 460. This implementation illustrates the case where the balance weight 470 extends on an upper side of the rotor core 270.

More specifically, the stator 250 may be provided with two permanent magnets 450 for each pole. The permanent magnet 450 may include a first permanent magnet 451 and a second permanent magnet 452 for each pole.

The first permanent magnet 451 and the second permanent magnet 452 may be formed of the same material, for example.

The first permanent magnet 451 and the second permanent magnet 452 may have the same size and shape, for example.

Figure 4:
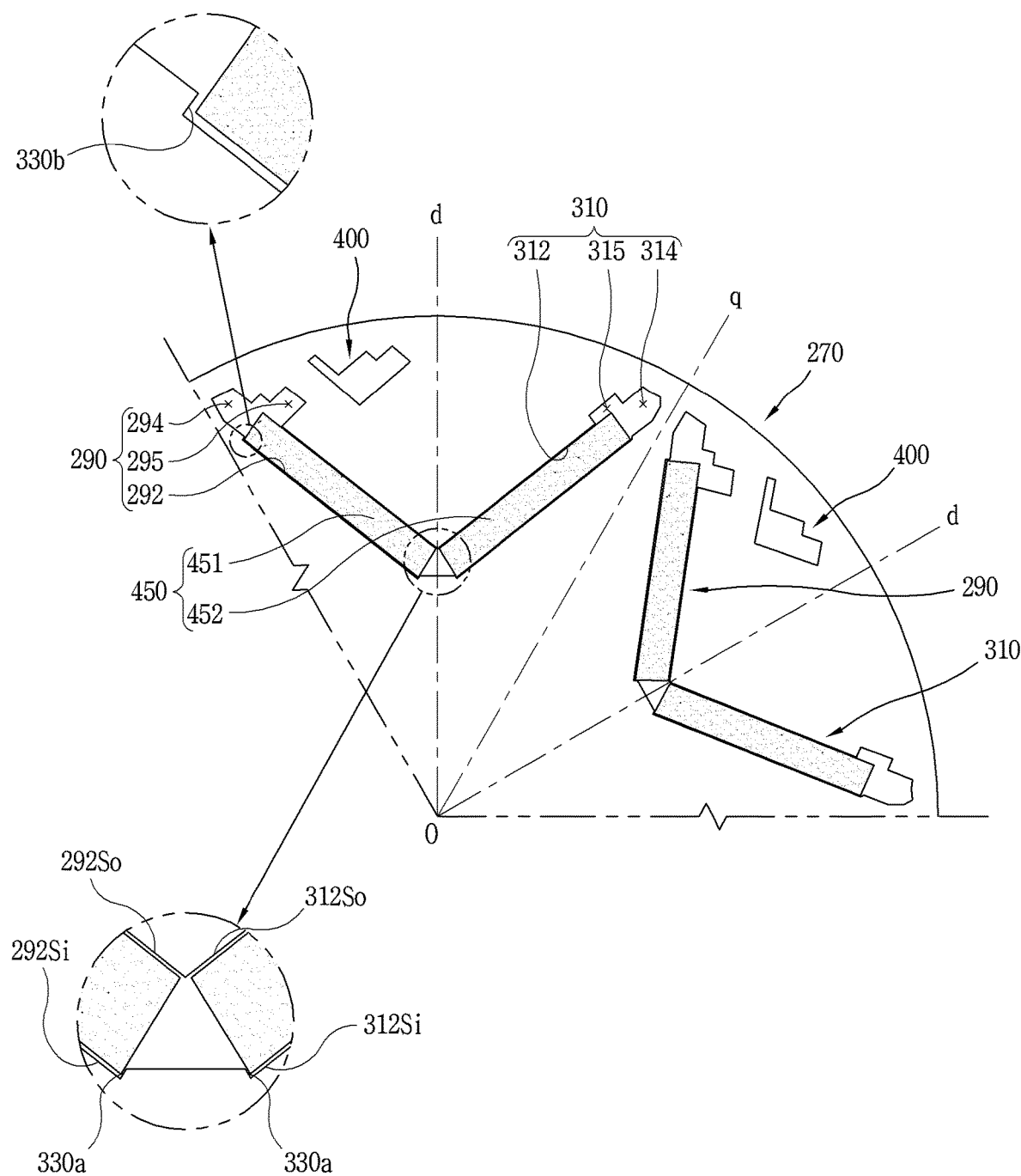
FIG. 4 is a main portion enlarged view of the rotor of FIG. 3.

FIG. 4 is a main portion enlarged view of the rotor of FIG. 3. As illustrated in FIG. 4, the rotor core 270 may include a first permanent magnet insertion portion 290 into which the first permanent magnet 451 is inserted. The rotor core 270 may include a second permanent magnet insertion portion 310 into which the second permanent magnet 452 is inserted. A d-axis d may be disposed between the first permanent magnet insertion portion 290 and the second permanent magnet insertion portion 310. The d-axis d may be shown as an extension line connecting a center of each magnetic pole of the rotor 250 and a center O of the rotor 250.

A q-axis q may be disposed between the magnetic poles of the rotor 250. More specifically, the q-axis q may be illustrated as an extension line connecting a point where a portion between the poles of the rotor 250 is divided into two equal parts to the center O of the rotor 250.

The first permanent magnet 451 may be disposed such that an end portion adjacent to the d-axis d faces (is closed to) the center of the rotor core 270, and another end portion spaced apart from the d-axis d is close to an end portion of the rotor core 270.

The second permanent magnet 452 may be disposed such that an end portion adjacent to the d-axis d faces (is close to) the center of the rotor core 270, and another end portion spaced apart from the d-axis d is close to the end portion of the rotor core 270.

The first permanent magnet 451 and the second permanent magnet 452 may be arranged in a "V" shape based on the d-axis d.

The first permanent magnet 451 and the second permanent magnet 452 may be arranged, for example, to form an interior angle, which corresponds to a preset angle (e.g., 108 degrees).

The first permanent magnet insertion portion 290 may be provided with an inner side 292Si and an outer side 292So arranged parallel with each other.

The second permanent magnet insertion portion 310 may be provided with an inner side 312Si and an outer side 312So arranged parallel with each other.

The outer side 292So of the first permanent magnet insertion portion 290 and the outer side 312So of the second permanent magnet insertion portion 310 may form 108 degrees.

The first permanent magnet insertion portion 290 and the second permanent magnet insertion portion 310 may be provided with permanent magnet clearance suppressing portions 330, respectively, for suppressing clearances of the first permanent magnet 451 and the second permanent magnet 452.

Each permanent magnet clearance suppressing portion 330 may include an inner suppressing portion 330a and an outer suppressing portion 330b. The inner suppressing portions 330a may be brought into contact with inner end portions of the first permanent magnet 451 and the second permanent magnet 452, respectively, and the outer suppressing portions 330b may be brought into contact with outer end portions of the first permanent magnet 451 and the second permanent magnet 452, respectively.

On the other hand, the electric motor 200 of this implementation may be configured such that a Magnetic pull force (MPF) acting between the stator core 220 and the rotor core 270 is asymmetrically formed based on the d-axis d.

This may result in suppressing an occurrence of vibration and noise during the rotation of the rotor 250.

The rotor core 270 may include, for example, slots 400 each axially formed therethrough at an outer side (outer part, outer region) of the permanent magnet 450 (i.e., the first permanent magnet 451 and the second permanent magnet 452) such that the MPF is asymmetrically formed based on the d-axis d.

Accordingly, a core reduction of a rear portion 350r of the d-axis d with respect to the d-axis d can be suppressed, thereby preventing an occurrence of a decrease in inertia of the rotor core 270 caused due to the formation of the slot 400.

Figure 5:
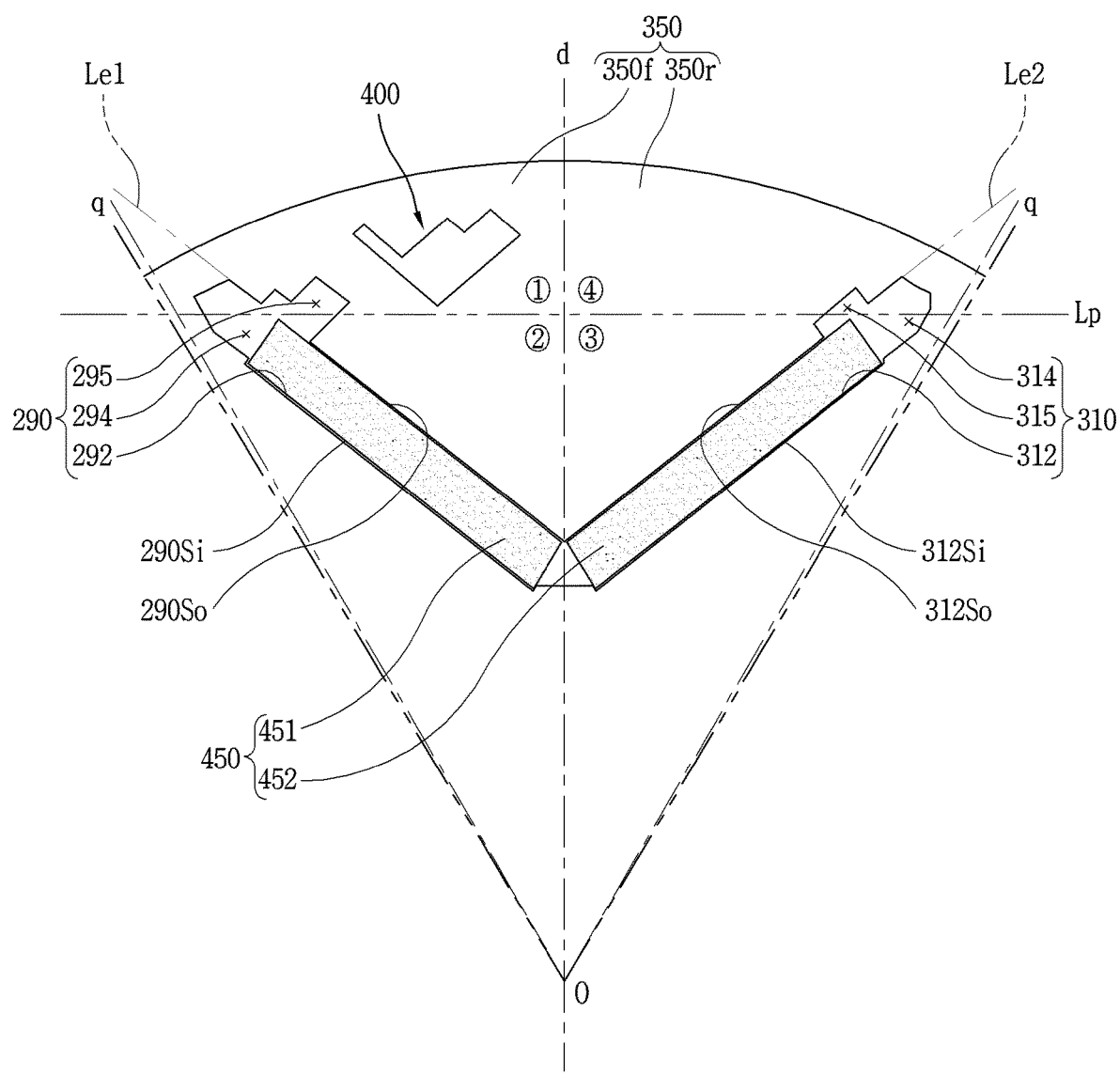
FIG. 5 is an enlarged view of a slot and a permanent magnet insertion portion of FIG. 4.
Figure 6:
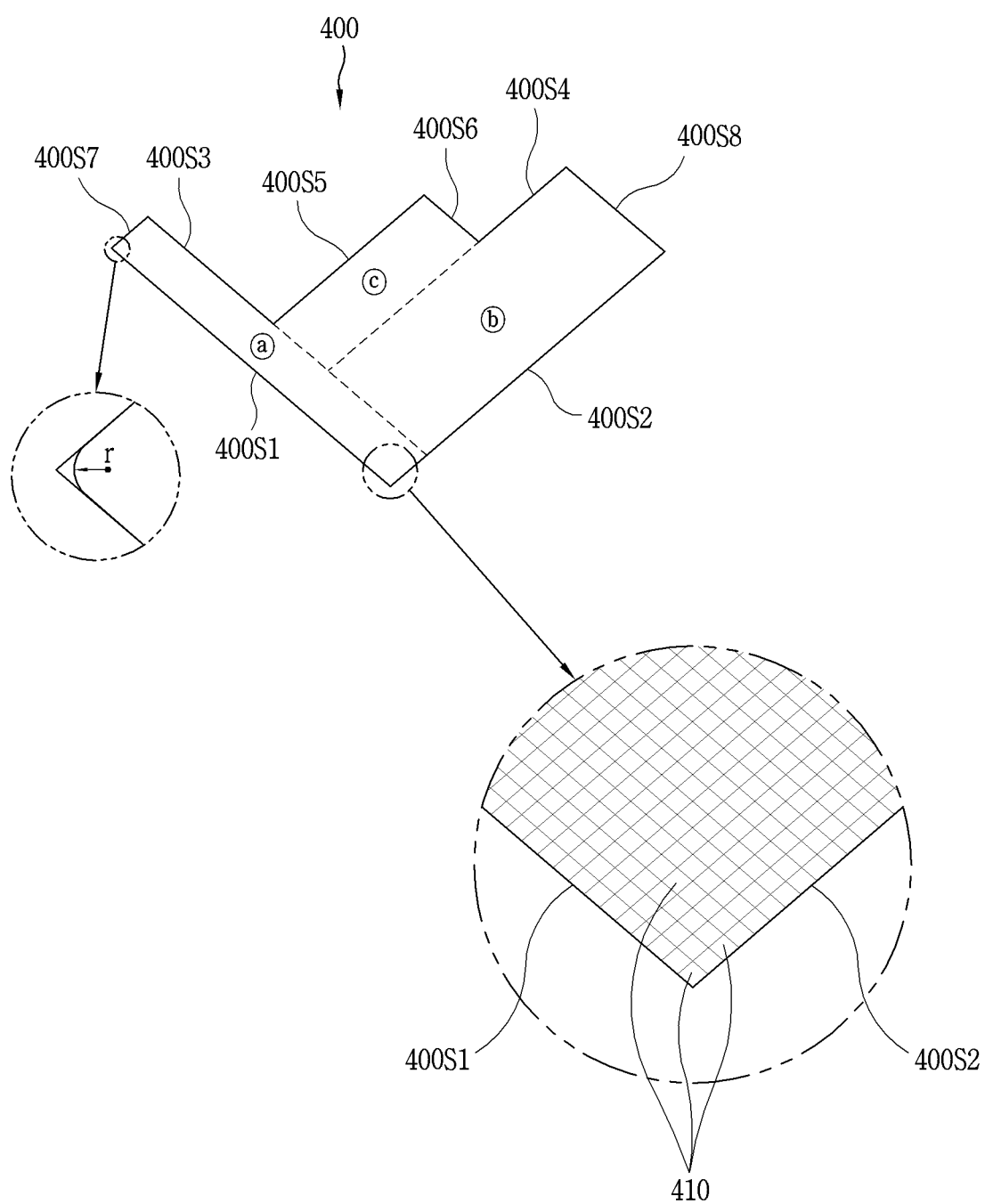
FIG. 6 is an enlarged view of the slot of FIG. 5.

FIG. 5 is an enlarged view of a slot and a permanent magnet insertion portion of FIG. 4, and FIG. 6 is an enlarged view of the slot of FIG. 5. As illustrated in FIG. 5, the slot 400 may be formed in a front portion 350f of the d-axis d in a rotating direction of the rotor core 270.

Accordingly, in regard to an outer core part 350 of the permanent magnet (i.e., the first permanent magnet 451 and the second permanent magnet 452) in the rotating direction of the rotor 250, a core area of the front portion 350f of the d-axis d may become smaller than a core area of the rear portion 350r of the d-axis d, such that a magnetic flux passing through the rear portion 350r of the d-axis d can increase more than a magnetic flux passing through the front portion 350f of the d-axis d.

More specifically, the outer core part 350 of the first permanent magnet insertion portion 290 and the second permanent magnet insertion portion 310 may be divided into the front portion 350f of the d-axis d and the rear portion 350r of the d-axis d with respect to the d-axis d. The front portion 350f of the d-axis d may be divided into a d-axis front outer part ① and a d-axis front inner part ② by a division line Lp passing vertically through the d-axis d. The rear portion 350r of the d-axis d may be divided into a d-axis rear inner part ③ and a d-axis rear outer part ④ by the division line Lp passing vertically through the d-axis d.

Here, the front portion 350f of the d-axis d and the rear portion 350r of the d-axis d may be divided, for example, by the d-axis d such that each divided part has the same core area.

The d-axis front outer part ① and the d-axis front inner part ② may be, for example, divided by the division line Lp to have the same core area.

In addition, the d-axis rear inner part ③ and the d-axis rear outer part ④ may be, for example, divided by the division line Lp to have the same core area.

In this implementation, the outer core part 350 of the permanent magnet insertion portion 280 (the first permanent magnet insertion portion 290 and the second permanent magnet insertion portion 310) may refer to a core part that is defined by the outer side 292So of the first permanent magnet insertion portion 290, the outer side 312So of the second permanent magnet insertion portion 310, a first extension line Le1 extending from the outer side 292So of the first permanent magnet insertion portion 290 up to an outer circumference of the rotor core 270, and a second extension line Le2 extending from the outer side 312So of the second permanent magnet insertion portion 310 up to the outer circumference of the rotor core 270.

Here, the slot 400 may be formed in a manner that the core area of the d-axis front inner part ② is equal to or larger than the core area of the d-axis front outer part ①, the core area of the d-axis rear inner part ③ is equal to or larger than the core area of the d-axis front inner part ②, and the core area of the d-axis rear outer part ④ is equal to or larger than the core area of the d-axis rear inner part ③.

That is, when the slot 400 is formed in all of the d-axis front outer part ①, the d-axis front inner part ②, the d-axis rear inner part ③, and the d-axis rear outer part ④, a slot area of the d-axis rear inner part ③ may be equal to or larger than a slot area of the d-axis rear outer part ④.

In addition, a slot area of the d-axis front inner part ② may be equal to or larger than a slot area of the d-axis rear inner part ③.

In addition, a slot area of the d-axis front outer part ① may be equal to or larger than a slot area of the d-axis front inner part ②.

Since the slot 400 is formed through the outer core part of the permanent magnet insertion portion 280, the core area of the front portion 350f of the d-axis d may become smaller than the core area of the rear portion 350r of the d-axis d.

In addition, an area of the slot 400 of the front portion 350f of the d-axis d may become smaller than the core area of the front portion 350f of the d-axis d.

Meanwhile, the slot 400 may be formed in a penetrating manner, for example, to have a shape including a plurality of rectangular sections.

The slot 400 may be divided into a plurality of rectangular sections.

The plurality of rectangular sections of the slot 400, for example, may be provided with unit plane figures 410 (e.g., rhombuses, parallelograms, rectangles or squares, circles, hexagons, etc.) with a relatively small area (size).

Here, the slot 400 may be formed, for example, by dividing the outer core part 350 of the permanent magnet insertion portion 280 into the unit plane figures 410, forming unit slots having sizes corresponding to the unit plane figures 410 in a penetrating manner, analyzing changes in MPF, and connecting outlines of unit slots (the unit plane figures 410) exhibiting a great effect of suppressing vibration and noise caused due to the MPF during the formation of the unit slots.

Each side of the plurality of rectangular sections of the slot 400 may be configured as, for example, an integer multiple of one side of the unit plane FIG. 410.

More specifically, for example, the slot 400, as illustrated in FIG. 6, may include a first side 400S1 arranged at the outside of the outer side 292So of the first permanent magnet insertion portion 290 to be in parallel with the outer side 292So, and a second side 400S2 extending from the first side 400S1 to be in parallel with the outer side 312So of the second permanent magnet insertion portion 310.

An interior angle between the first side 400S1 and the second side 400S2 of the slot 400 may be equal to an interior angle (e.g., 108 degrees) formed between the outer side 292So of the first permanent magnet insertion portion 290 and the outer side 312So of the second permanent magnet insertion portion 310.

The interior angle between the first side 400S1 and the second side 400S2 of the slot 400 may be, for example, 108 degrees.

The slot 400 may include a third side 400S3 disposed outside the first side 400S1 in parallel, and a fourth side 400S4 disposed at the outside of the second side 400S2 in parallel.

Here, the first side 400S1 and the third side 400S3 may be connected linearly (i.e., by a straight line 400S7).

In addition, the second side 400S2 and the fourth side 400S4 may be connected linearly (e.g., by a straight line 400S8).

The third side 400S3 and the fourth side 400S4 of the slot 400 may form an interior angle of 108 degrees.

Here, the third side 400S3 may have a length shorter than the first side 400S1.

The fourth side 400S4 may have a length shorter than the second side 400S2.

The slot 400 may further include a fifth side 400S5 extending from the third side 400S3 to be in parallel with the second side 400S2, and a sixth side 400S6 extending from the fourth side 400S4 to be in parallel with the firth side 400S1 and connected to the fifth side 400S5.

The third side 400S4 and the fifth side 400S5 may form an interior angle of 108 degrees.

The fourth side 400S4 and the sixth side 400S6 may form an interior angle of 108 degrees.

The slot 400 may include, for example, a first rectangular section ⓐ, a second rectangular section ⓑ, and a third rectangular section ⓒ.

The first rectangular section ⓐ, the second rectangular section ⓑ, and the third rectangular section ⓒ may be configured to have different numbers of unit plane figures 410.

Here, in regard to the unit plane FIG. 410, for example, may be implemented as a parallelogram having two sides parallel with the first side 400S1 of the slot 400 and two other sides parallel with the second side 400S2 of the slot 400.

As the unit plane figures 410 have smaller areas (or sizes), the outline of the slot 400 may be elaborate and various in shape.

Corners of each rectangular section of the slot 400 may be configured to have a minimum radius of curvature r for manufacturing (molding), for example.

Meanwhile, the first permanent magnet insertion portion 290 and the second permanent magnet insertion portion 310 may be asymmetrical with each other based on the d-axis d.

The first permanent magnet insertion portion 290 and the second permanent magnet insertion portion 310 may have different areas from each other.

More specifically, the area of the first permanent magnet insertion portion 290 may be larger than the area of the second permanent magnet insertion portion 310.

The first permanent magnet insertion portion 290 may include, for example, a first expansion slot 295 expanded toward the d-axis d.

The second permanent magnet insertion portion 310 may include, for example, a second expansion slot 315 expanded toward the d-axis d.

Here, an area of the first expansion slot 295 may be larger than an area of the second expansion slot 315.

Figure 7:
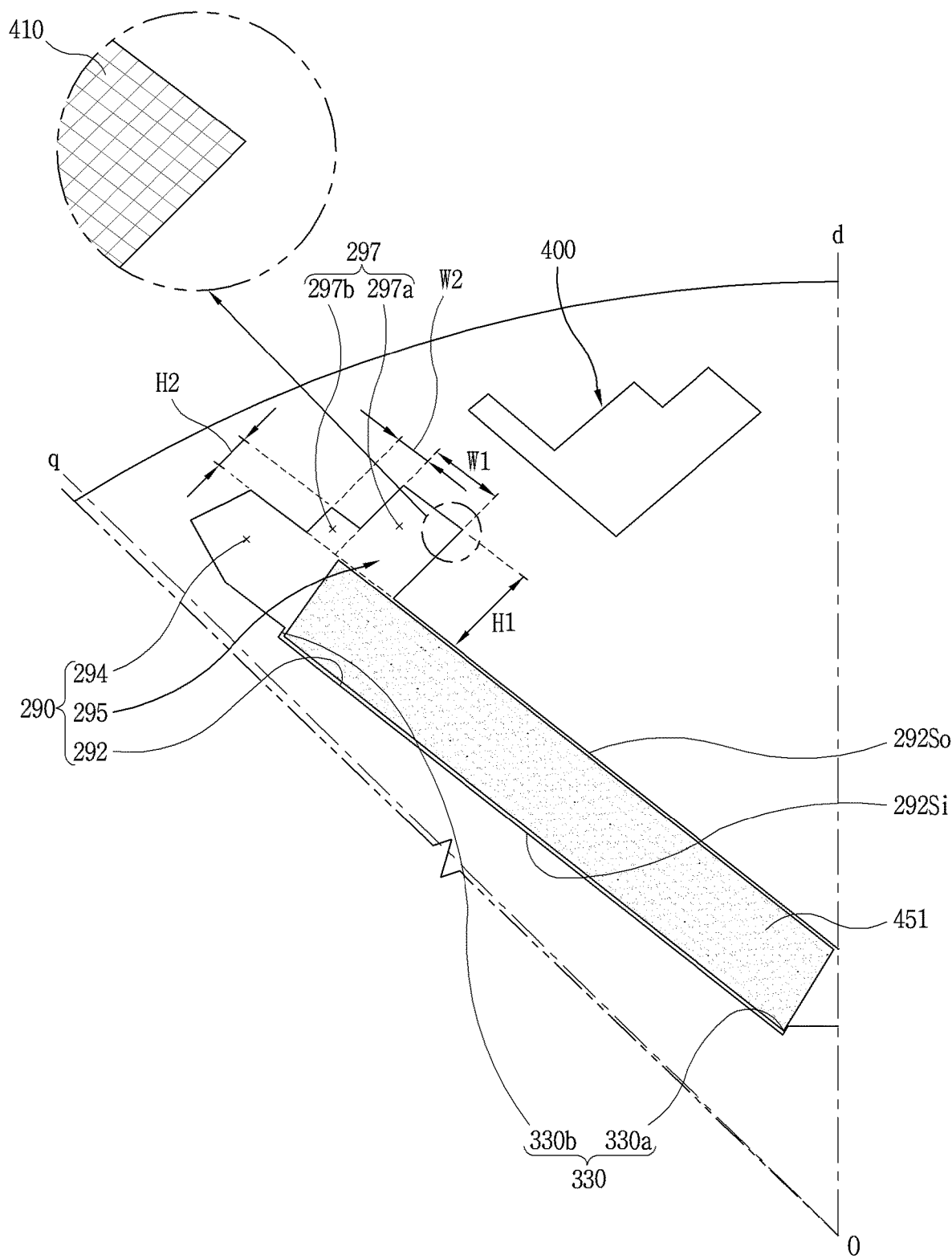
FIG. 7 is an enlarged view of a first permanent magnet insertion portion of FIG. 5.
Figure 8:
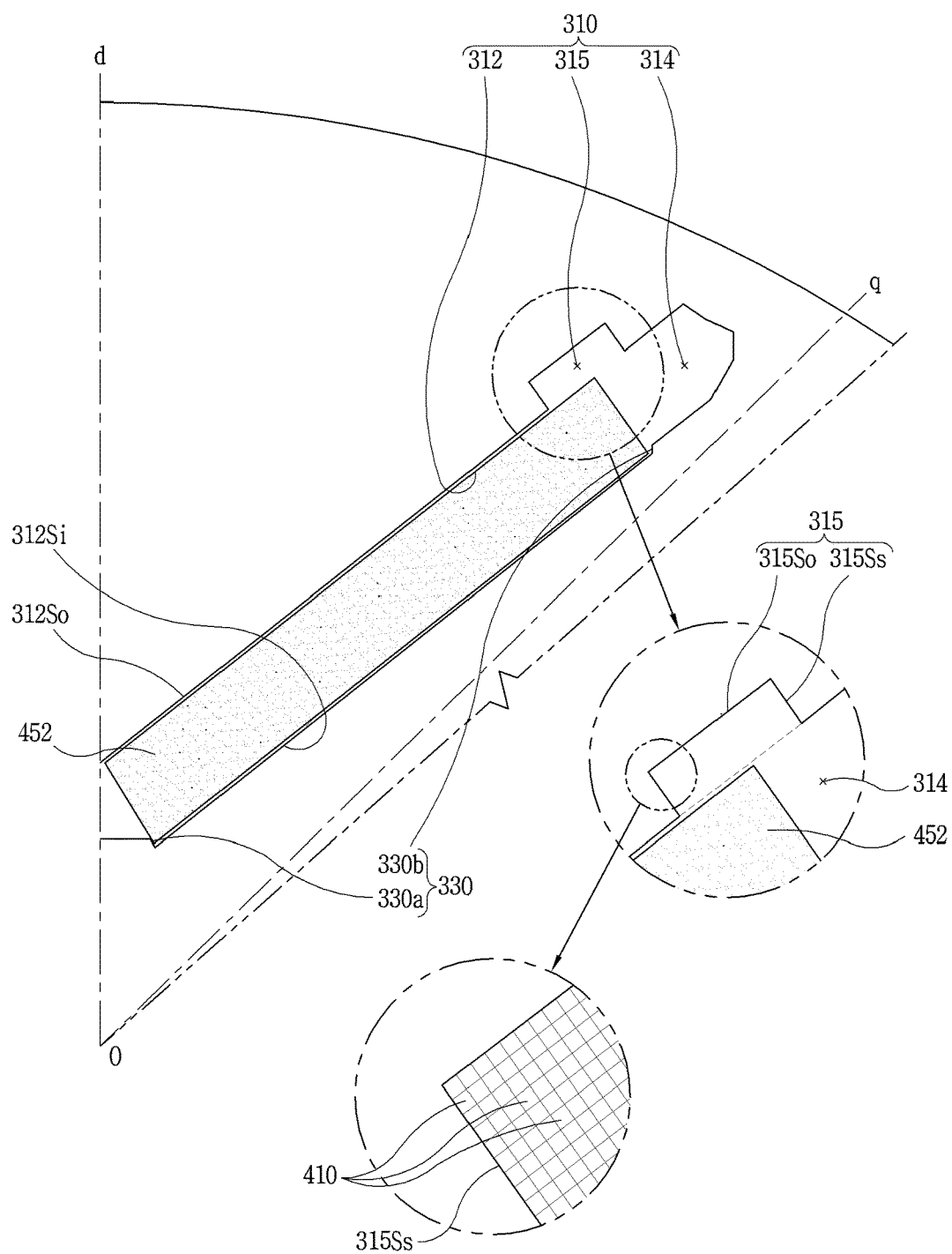
FIG. 8 is an enlarged view of a second permanent magnet insertion portion of FIG. 5.

FIG. 7 is an enlarged view of the first permanent magnet insertion portion of FIG. 5, and FIG. 8 is an enlarged view of the second permanent magnet insertion portion of FIG. 5. As illustrated in FIG. 7, the first permanent magnet insertion portion 290 may include a first permanent magnet accommodation space 292 in which the first permanent magnet 451 is accommodated, a first flux barrier 294 extending from one side of the first permanent magnet accommodation space 292, and the first expansion slot 295 expanded toward the d-axis d.

The first expansion slot 295 may include rectangular sections 297 having different sizes.

More specifically, the rectangular section 297 of the first expansion slot 295 may include, for example, a first protruding portion 297a protruding toward the d-axis d by a predetermined first height H1, and a second protruding portion 297b protruding at one side of the first protruding portion 297a by a second height H2 lower than the first height H1.

The rectangular section 297 (i.e., the first protruding portion 297a and the second protruding portion 297b) may include, for example, a plurality of unit plane figures 410 having a relatively small area.

The first protruding portion 297a may be configured to have a width W1 wider than a width W2 of the second protruding portion 297b.

The first protruding portion 297a may be larger than the second protruding portion 297b in view of an area.

Accordingly, the core area of the front portion 350f of the d-axis d may be smaller than the core area of the rear portion 350r of the d-axis d.

The first protruding portion 297a may include a larger number of unit plane figures 410 than the second protruding portion 297b.

As illustrated in FIG. 8, the second permanent magnet insertion portion 310 may include a second permanent magnet accommodation space 312 in which the second permanent magnet 452 is accommodated, a second flux barrier 314 extending from one side of the second permanent magnet accommodation space 312, and the second expansion slot 315 expanded toward the d-axis d.

The second expansion slot 315 may have, for example, a rectangular shape which is long in length along a lengthwise direction of the second permanent magnet 452.

More specifically, the second expansion slot 315 may include, for example, an outer side 315So disposed in parallel with the outer side 312So of the second permanent magnet insertion portion 310, and both sides 315Ss extending from both end portions of the outer side 315So to be connected to the outer side 312So of the second permanent magnet insertion portion 310.

With this configuration, when an operation is started and power is applied to the stator 210, the rotor 250 may rotate in a preset direction (counterclockwise in the drawing) centering on the rotation shaft 260, in response to an interaction between a magnetic field formed by the stator coil 171 and a magnetic field of the permanent magnets 450.

Between the stator core 220 and the rotor core 270, MPF formed at the front portion 350f of the d-axis d and MPF formed at the rear portion 350r of the d-axis d may be asymmetrical with each other due to the slot 400, with respect to the d-axis d that is a center of the magnetic pole of the rotor 250. Here, the MPF formed at the front portion 350f of the d-axis d which acts in a direction of suppressing the rotation of the rotor 250 may become smaller than the MPF formed at the rear portion 350r of the d-axis d which acts in a direction of facilitating the rotation of the rotor 250. Accordingly, vibration and noise occurred in the rotor 250 can be suppressed.

In addition, when the area of the outer core part 350 of the permanent magnet insertion portion 280 is divided with respect to the d-axis d, the slot 400 may be formed through the rotor 250 such that the core area of the front portion 350f of the d-axis d is smaller than the core area of the rear portion 350r of the d-axis d. Accordingly, the reduction of the core area of the rear portion 350r of the d-axis d can be suppressed, resulting in preventing a decrease in inertia of the rotor 250. An occurrence of vibration during low speed rotation of the rotor 250 can be prevented as well. In addition, an input may be reduced during the low speed rotation of the rotor 250, thereby improving operation efficiency.

Figure 9:
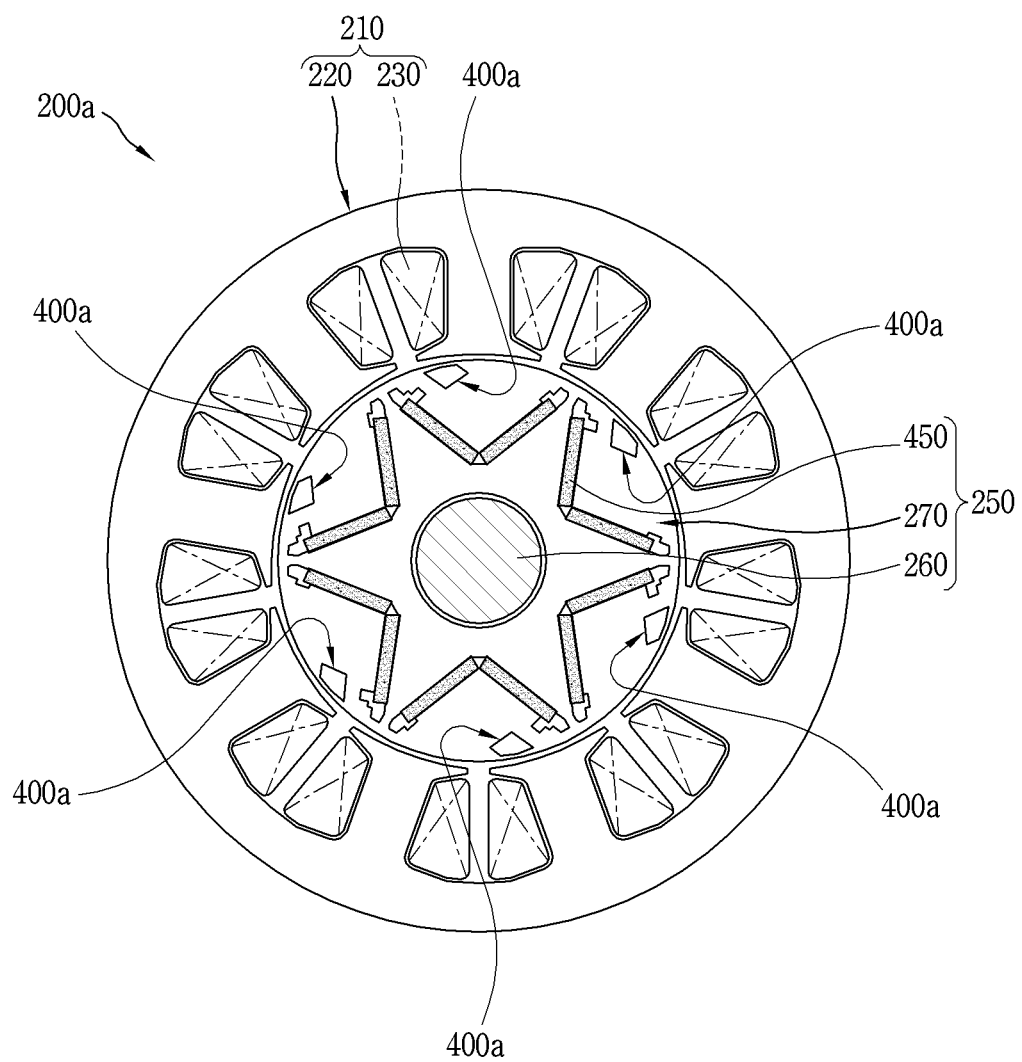
FIG. 9 is a horizontal sectional view of an electric motor in accordance with another implementation.
Figure 10:
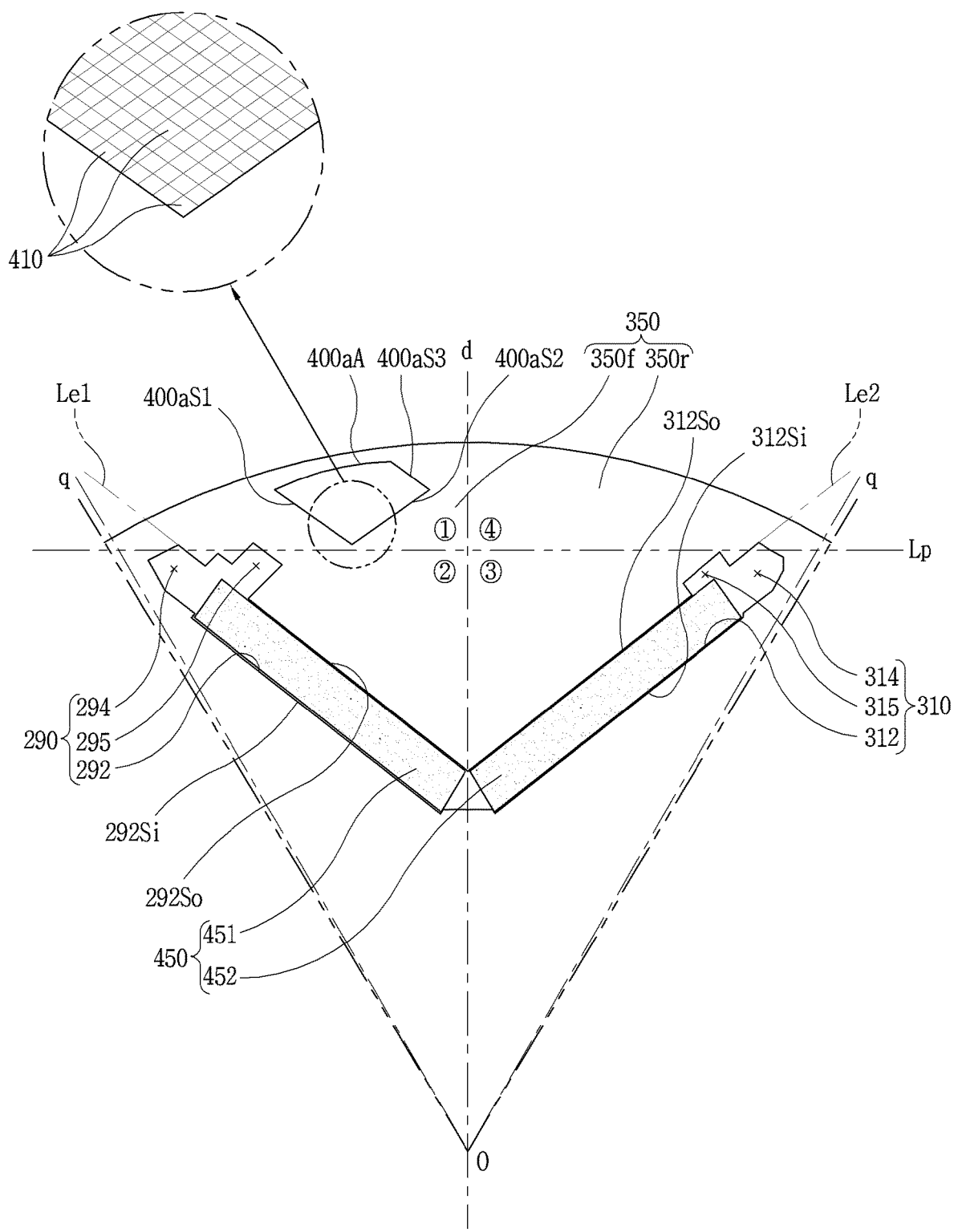
FIG. 10 is an enlarged view of a slot region of FIG. 9.

FIG. 9 is a horizontal sectional view of an electric motor in accordance with another implementation, and FIG. 10 is an enlarged view of a slot region of FIG. 9. As illustrated in FIGS. 9 and 10, an electric motor 200a according to this implementation may include a stator 210 and a rotor 250. The stator 210 may include a stator core 220 and a stator coil 230 wound around the stator core 220.

The rotor 250 may include a rotation shaft 260, a rotor core 270, and a plurality of permanent magnets 450 coupled to the rotor core 270 in an axial direction. The rotor 250 may have different magnetic poles alternately formed in a circumferential direction. The rotor 250 may be provided with two permanent magnets 450 for each magnetic pole. Each of the permanent magnets 450 may include a first permanent magnet 451 and a second permanent magnet 452 arranged in a "V" shape with respect to a d-axis d.

The rotor core 270 may include a permanent magnet insertion portion 280 formed therethrough in the axial direction so that the permanent magnet 450 can be inserted, and a slot 400a formed therethrough in the axial direction such that a core area of a front portion 350f of the d-axis d is smaller than a core area of a rear portion 350r of the d-axis d in a rotating direction of the rotor 250 when an outer core part 350 of the permanent magnet insertion portion 280 is divided based on the d-axis d.

The permanent magnet insertion portion 280 may include a first permanent magnet insertion portion 290 into which the first permanent magnet 451 is inserted, and a second permanent magnet insertion portion 310 into which the second permanent magnet 452 is inserted.

The first permanent magnet insertion portion 290 may include a first permanent magnet accommodation space 292 in which the first permanent magnet 451 is accommodated, a first flux barrier 294 extending from one side of the first permanent magnet accommodation space 292, and a first expansion slot 295 expanded toward the d-axis d.

Also, the second permanent magnet insertion portion 310 may include a second permanent magnet accommodation space 312 in which the second permanent magnet 452 is accommodated, a second flux barrier 314 extending from one side of the second permanent magnet accommodation space 312, and a second expansion slot 315 expanded toward the d-axis d.

Meanwhile, for example, the slot 400a may include, for example, a first side 400aS1 arranged at the outside of the outer side 292So of the first permanent magnet insertion portion 290 to be in parallel with the outer side 292So, and a second side 400aS2 extending from the first side 400aS1 to be in parallel with the outer side 312So of the second permanent magnet insertion portion 310.

The slot 400a may include, for example, a third side 400aS3 extending from an end portion of the second side 400aS2 to be in parallel with the first side 400aS1, and a connection section 400aA connecting the first side 400aS1 and the third side 400aS3.

Here, the connection section 400aA may be implemented in an arcuate shape to maintain a preset distance from the outer circumference of the rotor core 270.

The slot 400a may include a plurality of unit plane figures 410 having a relatively small area.

Here, the unit plane FIG. 410 may be implemented, for example, as a parallelogram having two sides arranged in parallel with the outer side 292So of the first permanent magnet insertion portion 290, and two other sides arranged in parallel with the outer side 312So of the second permanent magnet insertion portion 310.

In this implementation, the slot 400a may have a fourth side (not shown) linearly connecting the first side 400aS1 and the third side 400aS3. However, the fourth side (not shown) may be configured to have the connection section 400aA formed in the arcuate shape to maintain the same distance from the outer circumference of the rotor core 270.

With this configuration, when an operation is started and power is applied to the stator 210, the rotor 250 may rotate in a preset direction (counterclockwise in the drawing) centering on the rotation shaft 260, in response to an interaction between a magnetic field formed by the stator coil 171 and a magnetic field of the permanent magnets 450.

Between the stator core 220 and the rotor core 270, MPF formed at the front portion 350f of the d-axis d and MPF formed at the rear portion 350r of the d-axis d may be asymmetrical with each other due to the slot 400a, with respect to the d-axis d that is a center of the magnetic pole of the rotor 250. This may result in suppressing an occurrence of vibration and noise of the rotor 250.

In addition, the slot 400a may be formed through the rotor 250 such that the core area of the front portion 350f of the d-axis d is smaller than the core area of the rear portion 350r of the d-axis d. Accordingly, the reduction of the core area of the rear portion 350r of the d-axis d can be suppressed, resulting in preventing a decrease in inertia of the rotor 250. An occurrence of vibration during a low speed rotation of the rotor 250 can be prevented as well. In addition, an input may be reduced during the low speed rotation of the rotor 250, thereby improving operation efficiency.

Figure 11:
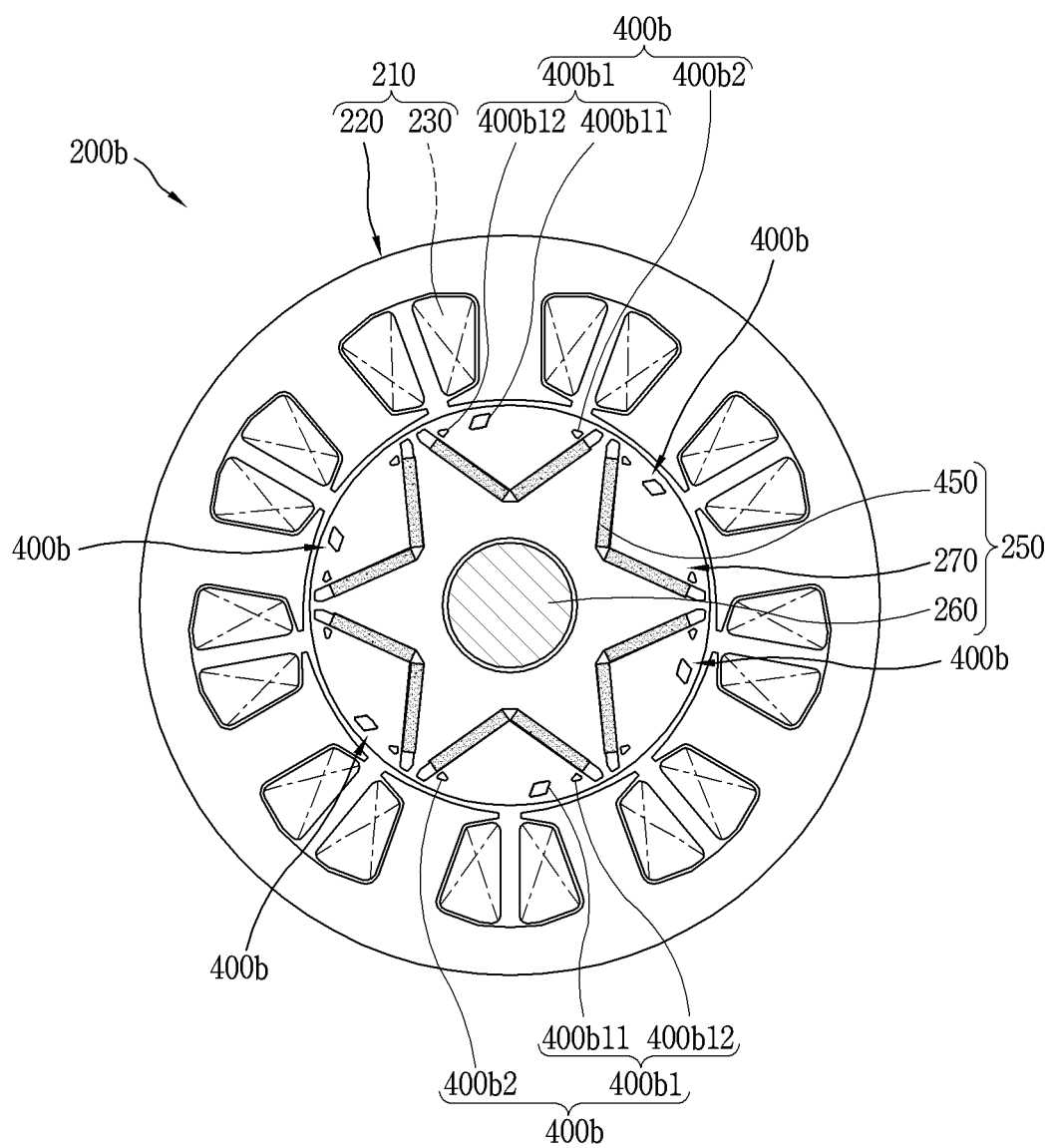
FIG. 11 is a horizontal sectional view of an electric motor in accordance with another implementation.
Figure 12:
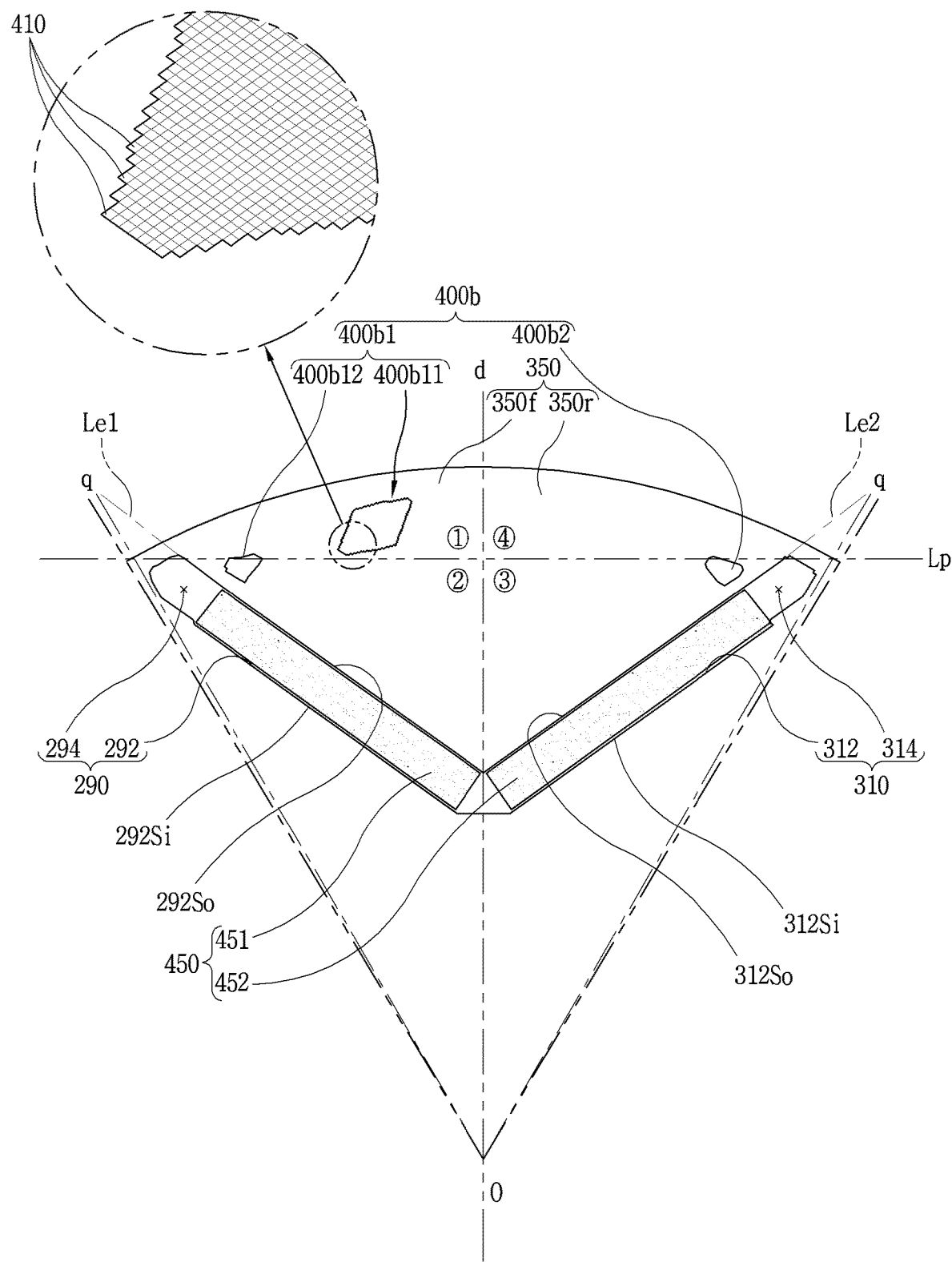
FIG. 12 is an enlarged view of a slot region of FIG. 11.

FIG. 11 is a horizontal sectional view of an electric motor in accordance with another implementation, and FIG. 12 is an enlarged view of a slot region of FIG. 11. An electric motor 200b according to this implementation may include a stator 210 and a rotor 250 as illustrated in FIGS. 11 and 12.

The stator 210, for example, may include a stator core 220 having a plurality of slots 226 and teeth 228, and a stator coil 230 wound around the stator core 220.

The rotor 250 may include a rotation shaft 260, a rotor core 270, and a plurality of permanent magnets 450.

The rotor 250 may have different magnetic poles (N pole and S pole) alternately formed in a circumferential direction.

The rotor 250 may include a first permanent magnet 451 and a second permanent magnet 452 for each pole.

The first permanent magnet 451 and the second permanent magnet 452 may be arranged to form a preset interior angle (e.g., 108 degrees).

The rotor core 270 may include a permanent magnet insertion portion 280 formed therethrough in an axial direction so that the permanent magnet 450 can be inserted, and a slot 400b formed therethrough in the axial direction such that a core area of a front portion 350f of a d-axis d is smaller than a core area of a rear portion 350r of the d-axis d in a rotating direction of the rotor 250 when an outer core part 350 of the permanent magnet insertion portion 280 is divided based on the d-axis d.

The first permanent magnet insertion portion 290 may include a first permanent magnet accommodation space 292 in which the first permanent magnet 451 is accommodated, and a first flux barrier 294 extending from one side of the first permanent magnet accommodation space 292.

Also, the second permanent magnet insertion portion 310 may include a second permanent magnet accommodation space 312 in which the second permanent magnet 452 is accommodated, and a second flux barrier 314 extending from one side of the second permanent magnet accommodation space 312.

Meanwhile, the slot 400b may include, for example, a front slot 400b1 disposed in the front portion 350f of the d-axis d and a rear slot 400b2 disposed in the rear portion 350r of the d-axis d.

The front slot 400b1 may include, for example, a first front slot 400b11 formed at the front of the d-axis d, and a second front slot 400b12 formed at an outer end region of the first permanent magnet 451. In some cases, the second front slot 400b12 may be referred to as a first slot, the rear slot 400b2 may be referred to as a second slot, and the first front slot 400b11 may be referred to as a third slot defined between the second front slot 400b12 and the d-axis.

Each of the front slot 400b1 and the rear slot 400b2 may include a plurality of unit plane figures 410 having a relatively small area.

The second front slot 400b12 may be formed through the rotor core 270, for example, with being spaced a preset distance apart from a boundary region between the first permanent magnet accommodation space 292 and the first flux barrier 294.

The rear slot 400b2 may be formed through the rotor core 270, for example, with being spaced apart from a boundary region between the second permanent magnet accommodating space 312 and the second flux barrier 314.

The second front slot 400b12 and the rear slot 400b2 may be formed symmetrically with each other with respect to the d-axis d, for example.

The first front slot 400*b*11 and the second front slot 400*b*12 may be formed through the d-axis front outer part ①.

The rear slot 400*b*2 may be formed through the d-axis rear outer part ④.

Here, the unit plane FIG. 410 may be implemented, for example, as a parallelogram having two sides arranged in parallel with the outer side 292So of the first permanent magnet insertion portion 290, and two other sides arranged in parallel with the outer side 312So of the second permanent magnet insertion portion 310.

In this implementation, outlines of the first front slot 400*b*11, the second front slot 400*b*12, and the rear slot 400*b*2 may be implemented in a linear or curved shape, for example. More specifically, outlines of the first front slot 400*b*11, the second front slot 400*b*12, and the rear slot 400*b*2 may be formed by connecting the outlines of the adjacent unit plane figures 410. More specifically, the outlines of the first front slot 400*b*11, the second front slot 400*b*12, and the rear slot 400*b*2 may define a step shape when enlarged at a large magnification.

With this configuration, when an operation is started and power is applied to the stator 210, the rotor 250 may rotate in a preset direction centering on the rotation shaft 260, in response to an interaction between a magnetic field formed by the stator coil 171 and a magnetic field of the permanent magnets 450.

Between the stator core 220 and the rotor core 270, MPF formed at the front portion 350*f* of the d-axis d and MPF formed at the rear portion 350*r* of the d-axis d may be asymmetrical with each other due to the slot 400*b*, with respect to the d-axis d that is a center of the magnetic pole of the rotor 250. This may result in suppressing an occurrence of vibration and noise of the rotor 250.

In addition, the slot 400*b* may be formed through the rotor 250 such that the core area of the front portion 350*f* of the d-axis d is smaller than the core area of the rear portion 350*r* of the d-axis d. Accordingly, the reduction of the core area of the rear portion 350*r* of the d-axis d can be suppressed, resulting in preventing a decrease in inertia of the rotor 250. An occurrence of vibration during low speed rotation of the rotor 250 can be prevented as well. In addition, an input may be reduced during the low speed rotation of the rotor 250, thereby improving operation efficiency.

Figure 13:
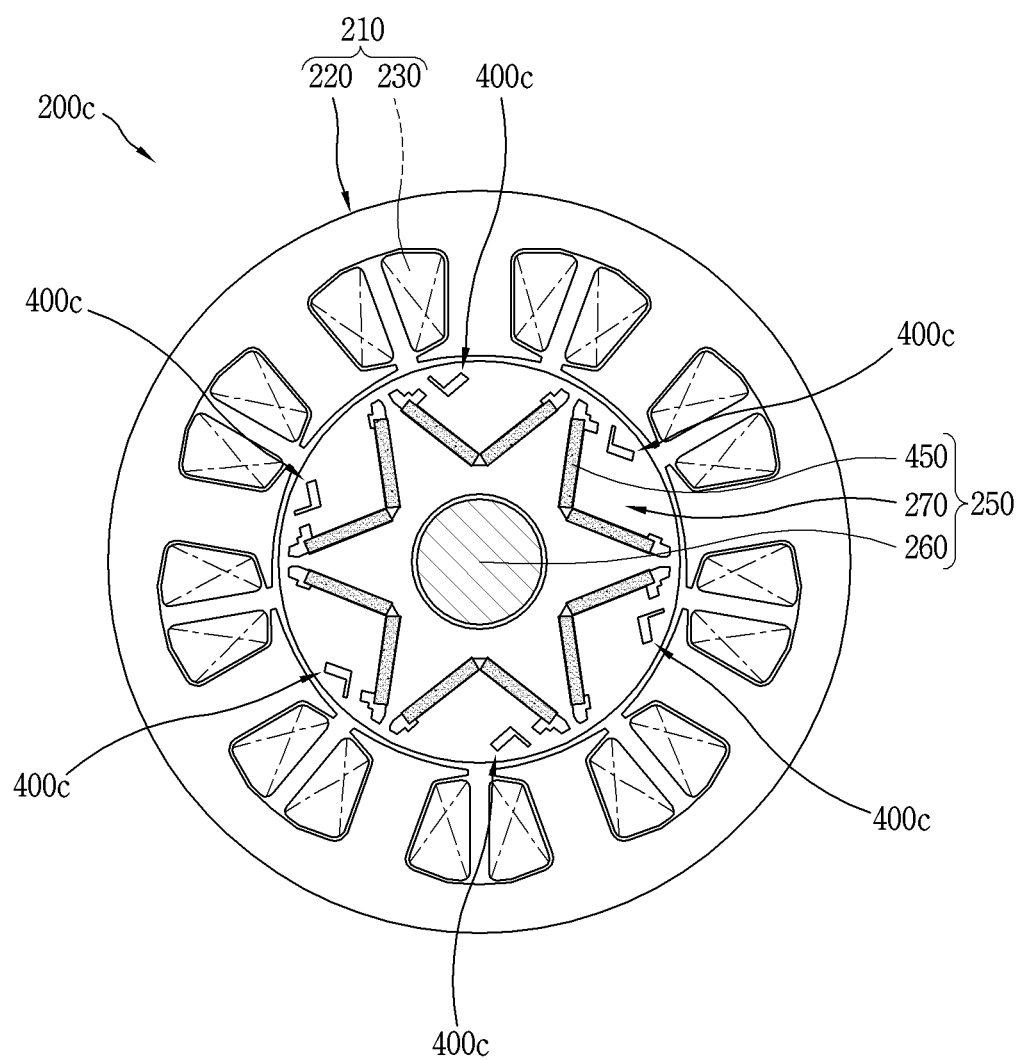
FIG. 13 is a horizontal sectional view of an electric motor in accordance with another implementation.
Figure 14:
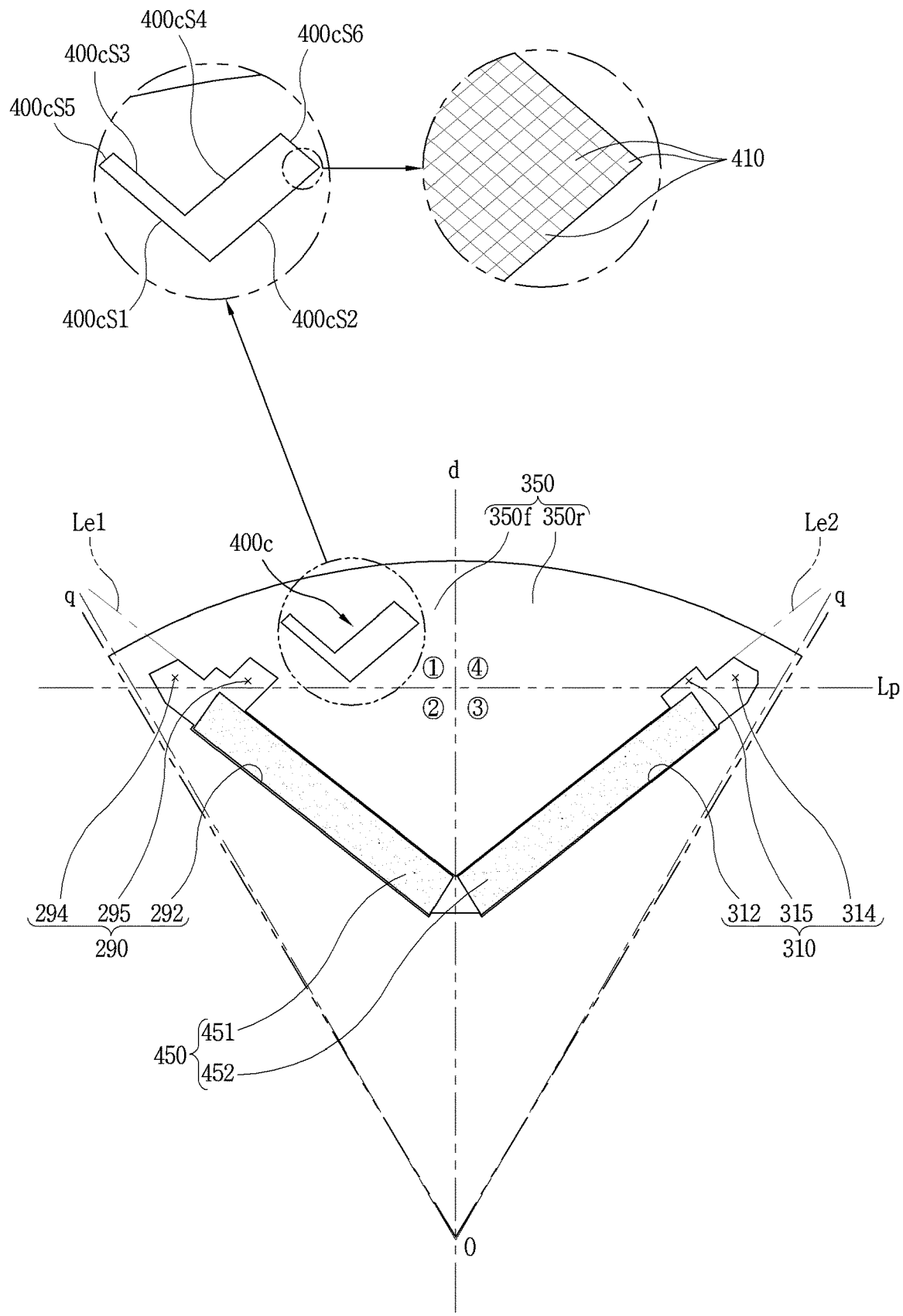
FIG. 14 is an enlarged view of a slot region of FIG. 13.

FIG. 13 is a horizontal sectional view of an electric motor in accordance with another implementation, and FIG. 14 is an enlarged view of a slot region of FIG. 13. As illustrated in FIGS. 13 and 14, an electric motor 200*c* according to this implementation may include a stator 210 and a rotor 250. The stator 210 may include a stator core 220 and a stator coil 230 wound around the stator core 220.

The rotor 250 may include a rotation shaft 260, a rotor core 270, and a plurality of permanent magnets 450.

The rotor 250 may have different magnetic poles (N pole and S pole) alternately formed in a circumferential direction.

Each of the permanent magnets 450 may include a first permanent magnet 451 and a second permanent magnet 452 for each pole.

The rotor core 270 may include a permanent magnet insertion portion 280 formed therethrough in an axial direction so that the permanent magnet 450 can be inserted, and a slot 400*c* formed therethrough in the axial direction such that a core area of a front portion 350*f* of a d-axis d is smaller than a core area of a rear portion 350*r* of the d-axis d in the rotating direction of the rotor 250 when an outer core part 350 of the permanent magnet insertion portion 280 is divided based on the d-axis d.

The permanent magnet insertion portion 280 may include a first permanent magnet insertion portion 290 and a second permanent magnet insertion portion 310.

The first permanent magnet insertion portion 290 may include a first permanent magnet accommodation space 292 in which the first permanent magnet 451 is accommodated, a first flux barrier 294 extending from one side of the first permanent magnet accommodation space 292, and a first expansion slot 295 expanded toward the d-axis d.

Also, the second permanent magnet insertion portion 310 may include a second permanent magnet accommodation space 312 in which the second permanent magnet 452 is accommodated, a second flux barrier 314 extending from one side of the second permanent magnet accommodation space 312, and a second expansion slot 315 expanded toward the d-axis d.

Meanwhile, the slot 400*c* may be formed, for example, through the d-axis front outer part ①.

More specifically, the slot 400*c* may include, for example, a first side 400*c*S1 arranged at the outside of the outer side 292So of the first permanent magnet insertion portion 290 to be in parallel with the outer side 292So, and a second side 400*c*S2 extending from the first side 400*c*S1 to be in parallel with the outer side 312So of the second permanent magnet insertion portion 310.

The slot 400*c* may include, for example, a third side 400*c*S3 arranged at the outside of the first side 400*c*S1 in parallel, and a fourth side 400*c*S4 arranged at the outside of the second side 400*c*S2 in parallel.

Here, a distance between the fourth side 400*c*S4 and the second side 400*c*S2 may be larger than a distance between the first side 400*c*S1 and the third side 400*c*S3.

Here, an outer end portion of the first side 400*c*S1 and an outer end portion of the third side 400*c*S3 may be connected by, for example, a straight line 400*c*S5.

An outer end portion of the second side 400*c*S2 and an outer end portion of the fourth side 400*c*S4 may be connected by, for example, a straight line 400*c*S6.

The slot 400*c* may be provided with a plurality of rectangular sections.

The plurality of rectangular sections of the slot 400*c* may include a plurality of unit plane figures 410 having a relatively small area.

The unit plane FIG. 410 may be implemented, for example, as a parallelogram having two sides arranged in parallel with the outer side 292So of the first permanent magnet insertion portion 290, and two other sides arranged in parallel with the outer side 312So of the second permanent magnet insertion portion 310.

With this configuration, when an operation is started and power is applied to the stator 210, the rotor 250 may rotate in a preset direction centering on the rotation shaft 260, in response to an interaction between a magnetic field formed by the stator coil 171 and a magnetic field of the permanent magnets 450.

Between the stator core 220 and the rotor core 270, MPF formed at the front portion 350*f* of the d-axis d and MPF formed at the rear portion 350*r* of the d-axis d may be asymmetrical with each other due to the slot 400*c*, with respect to the d-axis d that is a center of the magnetic pole of the rotor 250. This may result in suppressing an occurrence of vibration and noise of the rotor 250.

In addition, the slot 400*c* may be formed through the rotor 250 such that the core area of the front portion 350*f* of the d-axis d is smaller than the core area of the rear portion 350*r* of the d-axis d. Accordingly, the reduction of the core area of the rear portion 350*r* of the d-axis d can be suppressed, resulting in preventing a decrease in inertia of the rotor 250. An occurrence of vibration during low speed rotation of the rotor 250 can be prevented as well. In addition, an input may be reduced during the low speed rotation of the rotor 250, thereby improving operation efficiency.

Figure 15:
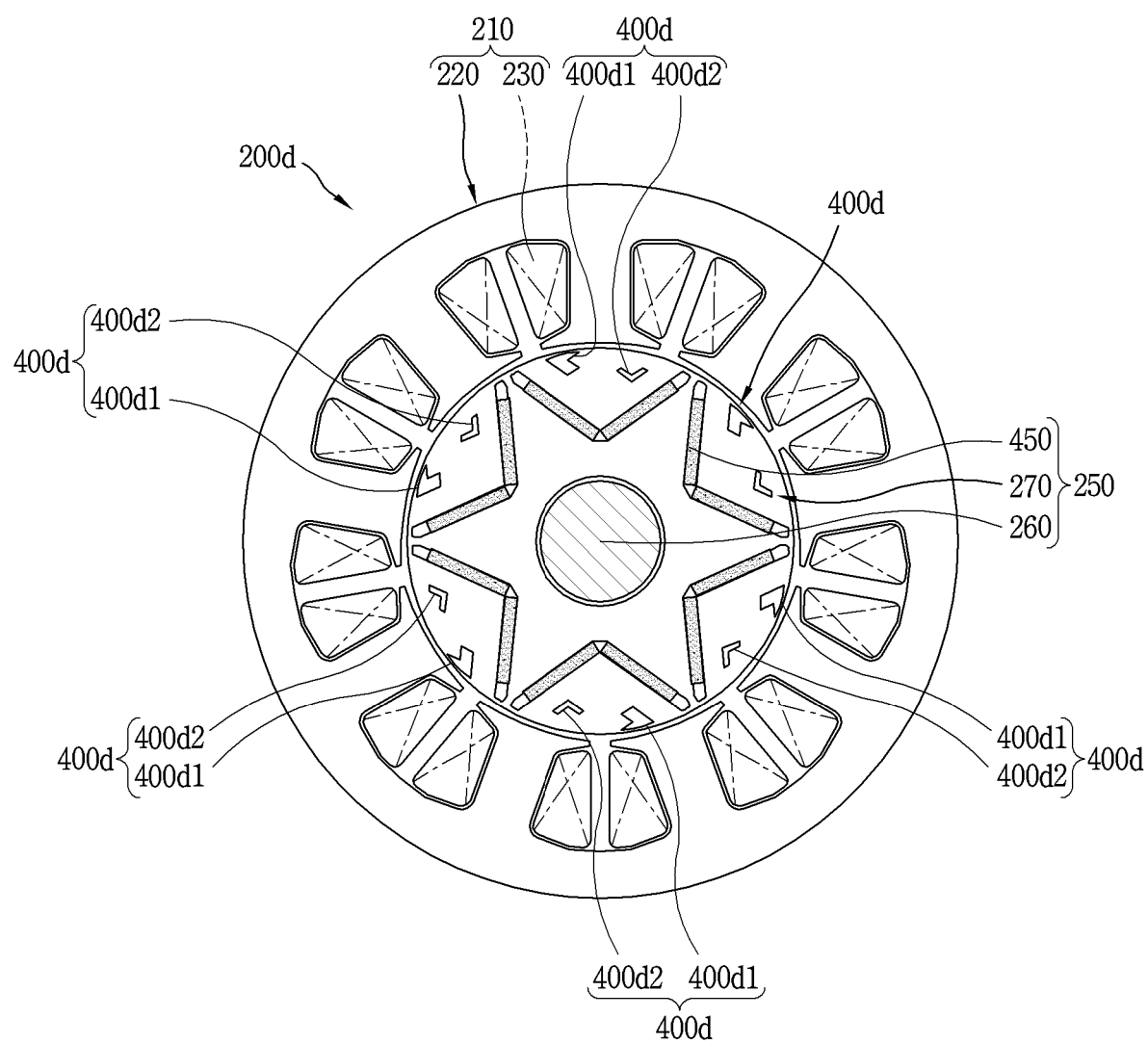
FIG. 15 is a horizontal sectional view of an electric motor in accordance with another implementation.
Figure 16:
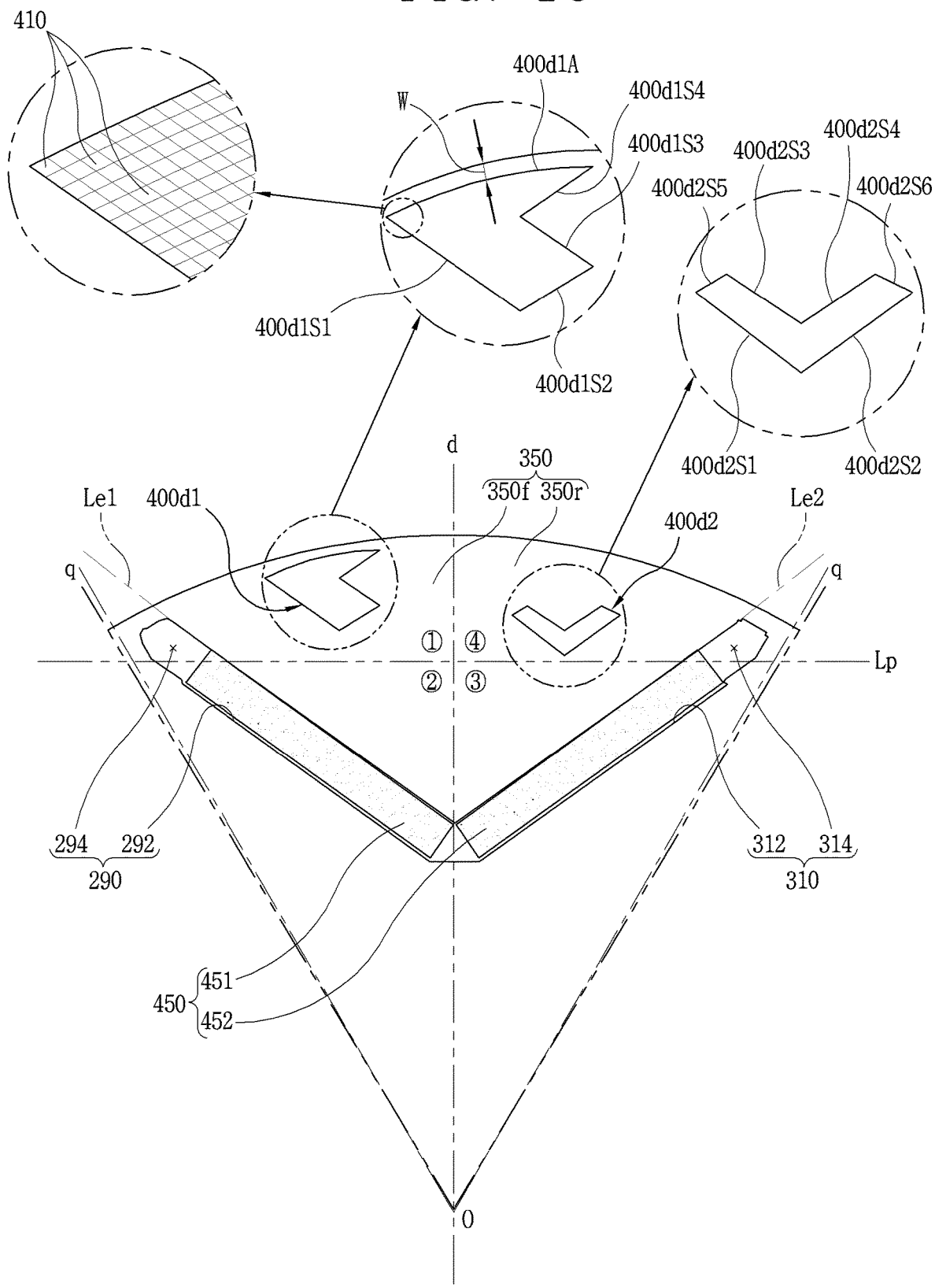
FIG. 16 is an enlarged view of a slot region of FIG. 15.

FIG. 15 is a horizontal sectional view of an electric motor in accordance with another implementation, and FIG. 16 is an enlarged view of a slot region of FIG. 15. As illustrated in FIGS. 15 and 16, an electric motor 200d according to this implementation may include a stator 210 and a rotor 250.

The rotor 250 may include a rotation shaft 260, a rotor core 270, and a plurality of permanent magnets 450.

The rotor 250 may have different magnetic poles (N pole and S pole) alternately formed in the circumferential direction.

The rotor 250 may include a first permanent magnet 451 and a second permanent magnet 452 for each pole.

The rotor core 270 may include a permanent magnet insertion portion 280 formed therethrough in an axial direction so that the permanent magnet 450 can be inserted, and a slot 400d formed therethrough in the axial direction such that a core area of a front portion 350f of a d-axis d is smaller than a core area of a rear portion 350r of the d-axis d in a rotating direction of the rotor 250 when an outer core part 350 of the permanent magnet insertion portion 280 is divided based on the d-axis d.

The first permanent magnet insertion portion 290 may include a first permanent magnet accommodation space 292 in which the first permanent magnet 451 is accommodated, and a first flux barrier 294 extending from one side of the first permanent magnet accommodation space 292.

Also, the second permanent magnet insertion portion 310 may include a second permanent magnet accommodation space 312 in which the second permanent magnet 452 is accommodated, and a second flux barrier 314 extending from one side of the second permanent magnet accommodation space 312.

Meanwhile, the slot 400d may include, for example, a front slot 400d1 disposed in the front portion 350f of the d-axis d and a rear slot 400d2 disposed in the rear portion 350r of the d-axis d.

The slot 400d1 may be formed, for example, through the d-axis front outer part ①.

The rear slot 400d2 may be formed, for example, through the d-axis rear outer part ④.

The area of the front slot 400d1 may be larger than the area of the rear slot 400d2.

When the outer core part 350 of the first permanent magnet insertion portion 290 and the second permanent magnet insertion portion 310 is divided based on the d-axis d, the core area of the front portion 350f of the d-axis d may be smaller than the core area of the rear portion 350r of the d-axis d.

More specifically, for example, the front slot 400d1 may include, for example, a first side 400d1S1 arranged in parallel with the outer side 292So of the first permanent magnet insertion portion 290, and a second side 400d1S2 extending from the first side 400d1S1 to be in parallel with the outer side 312So of the second permanent magnet insertion portion 310.

The front slot 400d1 may further include, for example, a third side 400d1S3 extending from an end portion of the second side 400d1S2 to be in parallel with the first side 400aS1, an arcuate section 400d1A extending from an end portion of the first side 400d1S1 to be in parallel with an outer circumference of the rotor core 270, and a connection section 400d1S4 connecting the arcuate section 400d1A and the third side 400d1S3.

The outer circumference of the rotor core 270 and the arcuate section 400d1A may be configured to maintain the same distance W therebetween.

The rear slot 400d2 may include, for example, a first side 400d2S1 arranged in parallel with the outer side 292So of the first permanent magnet insertion portion 290, and a second side 400d2S2 extending from the first side 400d2S1 to be in parallel with the outer side 312So of the second permanent magnet insertion portion 310.

The rear slot 400d2 may include, for example, a third side 400d2S3 extending from an end portion of the second side 400d2S2 to be in parallel with the first side 400d2S1, and a fourth side 400d2S4 extending from the third side 400d2S3 to be in parallel with the first side 400d2S1.

The first side 400d2S1 and the third side 400d2S3 of the rear slot 400d2 may be connected, for example, by a straight line 400d2S5.

In addition, the second side 400d2S2 and the fourth side 400d2S4 of the rear slot 400d2 may be connected, for example, by a straight line 400d2S6.

Each of the front slot 400d1 and the rear slot 400d2 may include a plurality of unit plane figures 410 having a relatively small area.

The unit plane FIG. 410 may be implemented, for example, as a parallelogram having two sides arranged in parallel with the outer side 292So of the first permanent magnet insertion portion 290, and two other sides arranged in parallel with the outer side 312So of the second permanent magnet insertion portion 310.

With this configuration, when an operation is started and power is applied to the stator 210, the rotor 250 may rotate in a preset direction centering on the rotation shaft 260, in response to an interaction between a magnetic field formed by the stator coil 171 and a magnetic field of the permanent magnets 450.

Between the stator core 220 and the rotor core 270, MPF formed at the front portion 350f of the d-axis d and MPF formed at the rear portion 350r of the d-axis d may be asymmetrical with each other due to the slot 400d, with respect to the d-axis d that is a center of the magnetic pole of the rotor 250. This may result in suppressing an occurrence of vibration and noise of the rotor 250.

In addition, the slot 400d may be formed through the rotor 250 such that the core area of the front portion 350f of the d-axis d is smaller than the core area of the rear portion 350r of the d-axis d. Accordingly, the reduction of the core area of the rear portion 350r of the d-axis d can be suppressed, resulting in preventing a decrease in inertia of the rotor 250. An occurrence of vibration during low speed rotation of the rotor 250 can be prevented as well. In addition, an input may be reduced during the low speed rotation of the rotor 250, thereby improving operation efficiency.

Figure 17:
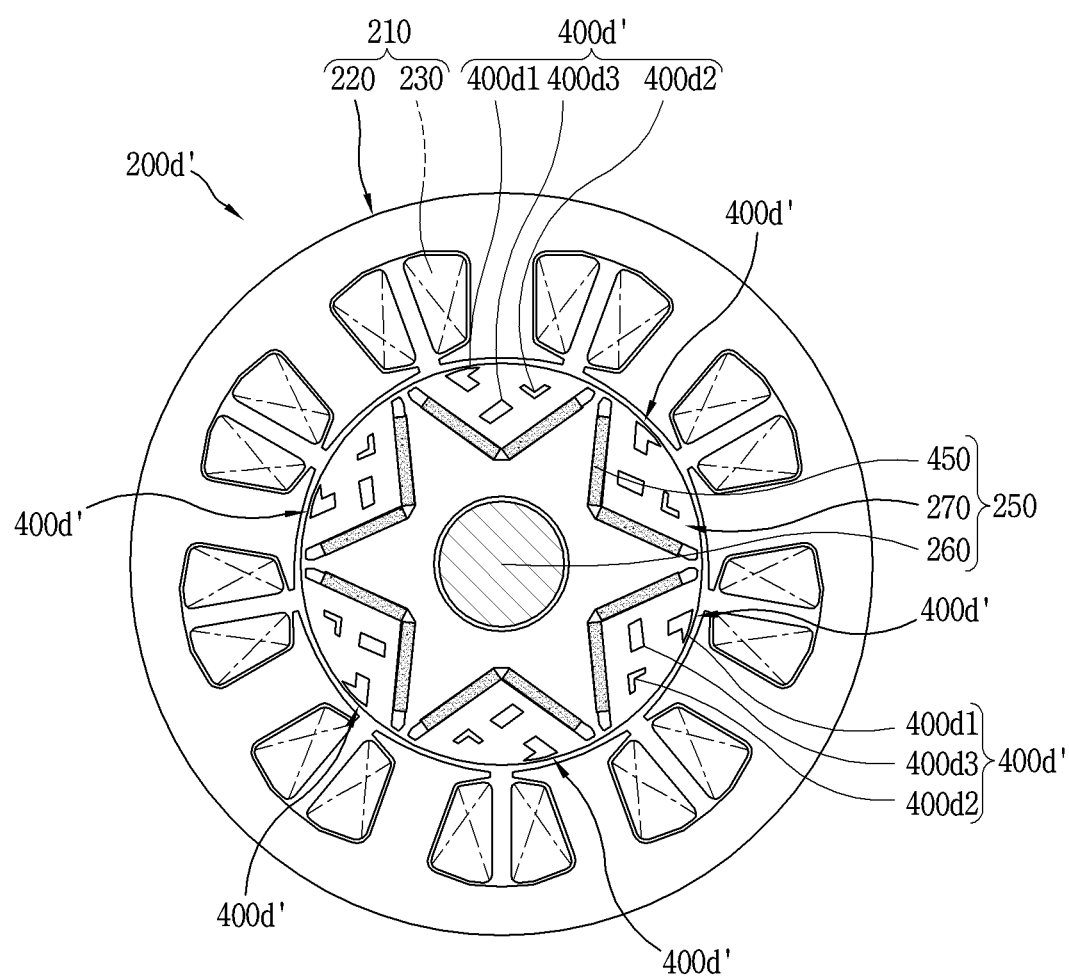
FIG. 17 is a horizontal sectional view of an electric motor in accordance with another implementation.
Figure 18:
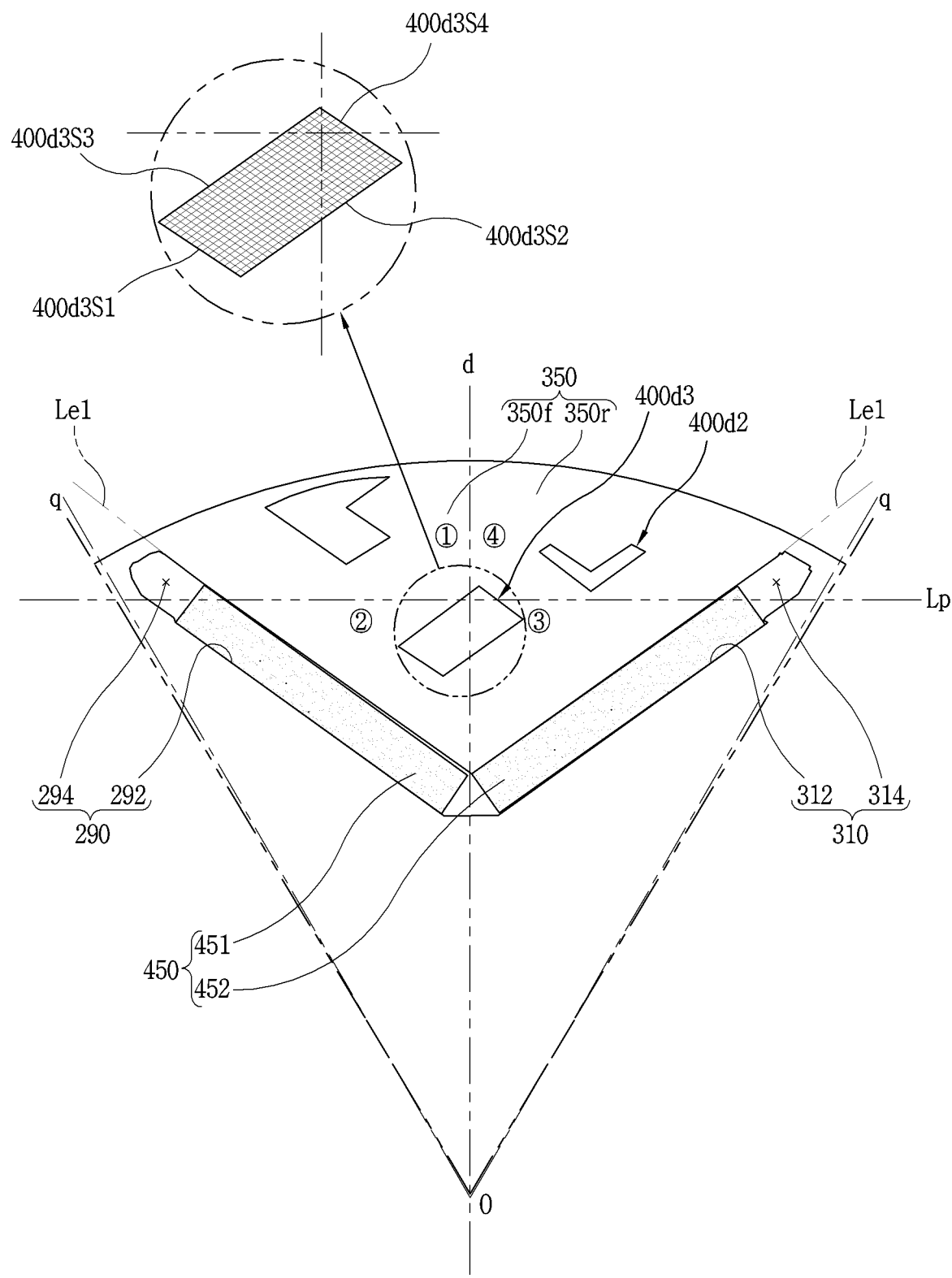
FIG. 18 is an enlarged view of a slot region of FIG. 17.

FIG. 17 is a horizontal sectional view of an electric motor in accordance with another implementation, and FIG. 18 is an enlarged view of a slot region of FIG. 17. As illustrated in FIGS. 17 and 18, an electric motor 200d according to this implementation may include a stator 210 and a rotor 250.

The rotor 250 may include a rotation shaft 260, a rotor core 270, and a plurality of permanent magnets 450.

The rotor 250 may have different magnetic poles (N pole and S pole) alternately formed in a circumferential direction.

The rotor 250 may include a first permanent magnet 451 and a second permanent magnet 452 for each pole.

The rotor core 270 may include a permanent magnet insertion portion 280 formed therethrough in an axial direction so that the permanent magnet 450 can be inserted, and a slot 400d' formed therethrough in the axial direction such that a core area of a front portion 350f of a d-axis d is smaller than a core area of a rear portion 350r of the d-axis d in a rotating direction of the rotor 250 when an outer core part 350 of the permanent magnet insertion portion 280 is divided based on the d-axis d.

The first permanent magnet insertion portion 290 may include a first permanent magnet accommodation space 292 in which the first permanent magnet 451 is accommodated, and a first flux barrier 294 extending from one side of the first permanent magnet accommodation space 292.

Also, the second permanent magnet insertion portion 310 may include a second permanent magnet accommodation space 312 in which the second permanent magnet 452 is accommodated, and a second flux barrier 314 extending from one side of the second permanent magnet accommodation space 312.

Meanwhile, the slot 400d' may include, for example, a front slot 400d1 disposed in the front portion 350f of the d-axis d, a rear slot 400d2 disposed in the rear portion 350r of the d-axis d, and a central slot 400d3 formed over the front and rear sides of the d-axis d.

The front slot 400d1 may be formed, for example, through the d-axis front outer part ④.

The rear slot 400d2 may be formed, for example, through the d-axis rear outer part ④.

The central slot 400d3 may be formed all over, for example, the d-axis front outer part ①, the d-axis front inner part ②, the d-axis rear inner part ③, and the d-axis rear outer part ④.

This implementation illustrates that the central slot 400d3 is formed over the d-axis front outer part ①, the d-axis front inner part ②, the d-axis rear inner part ③, and the d-axis rear outer part ④. However, this implementation is merely illustrative and the present disclosure may not be limited to this. The central slot 400d3 may alternatively be formed over, for example, the d-axis front inner part ② and the d-axis rear inner part ③.

The front slot 400d1 may be larger than the rear slot 400d2 in view of an area.

When the outer core part 350 of the first permanent magnet insertion portion 290 and the second permanent magnet insertion portion 310 is divided based on the d-axis d, the core area of the front portion 350f of the d-axis d may be smaller than the core area of the rear portion 350r of the d-axis d.

More specifically, the front slot 400d1 may include, for example, a first side 400d1S1 arranged in parallel with the outer side 292So of the first permanent magnet insertion portion 290, and a second side 400d1S2 extending from the first side 400d1S1 to be in parallel with the outer side 312So of the second permanent magnet insertion portion 310.

The front slot 400d1 may further include, for example, a third side 400d1S3 extending from an end portion of the second side 400d1S2 to be in parallel with the first side 400aS1, an arcuate section 400d1A extending from an end portion of the first side 400d1S1 to be in parallel with an outer circumference of the rotor core 270, and a connection section 400d1S4 connecting the arcuate section 400d1A and the third side 400d1S3.

The outer circumference of the rotor core 270 and the arcuate section 400d1A may be configured to maintain the same distance W therebetween.

The rear slot 400d2 may include, for example, a first side 400d2S1 arranged in parallel with the outer side 292So of the first permanent magnet insertion portion 290, and a second side 400d2S2 extending from the first side 400d2S1 to be in parallel with the outer side 312So of the second permanent magnet insertion portion 310.

The rear slot 400d2 may include, for example, a third side 400d2S3 extending from an end portion of the second side 400d2S2 to be in parallel with the first side 400d2S1, and a fourth side 400d2S4 extending from the third side 400d2S3 to be in parallel with the first side 400d2S1.

The central slot 400d3 may include, for example, a first side 400d3S1 disposed in parallel with the outer side 292So of the first permanent magnet insertion portion 290, a second side 400d3S2 extending from one end portion of the first side 400d3S1 to be in parallel with the outer side 312So of the second permanent magnet insertion portion 310, a third side 400d3S3 extending from another end portion of the first side 400d3S1 to be in parallel with the second side 400d3S2, and a fourth side 400d3S4 extending from another end portion of the second side 400d3S2 to be in parallel with the first side 400d3S1.

Here, the front slot 400d1, the rear slot 400d2, and the central slot 400d3 may be configured such that a total area of the slot disposed in the d-axis rear inner part ③ is equal to or larger than a total area of the slot disposed in the d-axis rear outer part ④.

A total area of the slot disposed in the d-axis front inner part ② may be equal to or larger than a total area of the slot disposed in the d-axis rear inner part ③.

A total area of the slot disposed in the d-axis front outer part ① may be equal to or larger than a total area of the slot disposed in the d-axis front inner part ②.

On the other hand, each of the front slot 400d1, the rear slot 400d2, and the central slot 400d3 may include a plurality of unit plane figures 410 having a relatively small area.

The unit plane FIG. 410 may be implemented, for example, as a parallelogram having two sides arranged in parallel with the outer side 292So of the first permanent magnet insertion portion 290, and two other sides arranged in parallel with the outer side 312So of the second permanent magnet insertion portion 310.

With this configuration, when an operation is started and power is applied to the stator 210, the rotor 250 may rotate in a preset direction centering on the rotation shaft 260, in response to an interaction between a magnetic field formed by the stator coil 171 and a magnetic field of the permanent magnets 450.

Between the stator core 220 and the rotor core 270, MPF formed at the front portion 350f of the d-axis d and MPF formed at the rear portion 350r of the d-axis d may be asymmetrical with each other due to the slot 400d', with respect to the d-axis d that is a center of the magnetic pole of the rotor 250. This may result in suppressing an occurrence of vibration and noise of the rotor 250.

In addition, the slot 400d' may be formed through the rotor 250 such that the core area of the front portion 350f of the d-axis d is smaller than the core area of the rear portion 350r of the d-axis d. Accordingly, the reduction of the core area of the rear portion 350r of the d-axis d can be suppressed, resulting in preventing a decrease in inertia of the rotor 250. An occurrence of vibration during a low speed rotation of the rotor 250 can be prevented as well. In addition, an input may be reduced during the low speed rotation of the rotor 250, thereby improving operation efficiency.

In the foregoing, exemplary embodiments of the present invention have been shown and described. However, the present invention may be embodied in various forms without departing from the spirit or essential characteristics thereof, and accordingly, it is intended that the embodiment described above not be limited by the detailed description provided herein.

Moreover, even if any embodiment is not specifically disclosed in the foregoing detailed description, it should be broadly construed within the scope of the technical spirit, as defined in the accompanying claims. Furthermore, all modifications and variations included within the technical scope of the claims and their equivalents should be covered by the accompanying claims.

What is claimed is:

1. An electric motor comprising:
    a stator; and
    a rotor disposed in the stator and spaced apart from the stator by a preset gap, the rotor being configured to rotate with respect to the stator,
    wherein the rotor comprises:
        a rotation shaft,
        a rotor core coupled to the rotation shaft, and
        a plurality of permanent magnets that are coupled to the rotor core and extend in an axial direction of the rotor, the plurality of permanent magnets defining magnetic poles along a circumferential direction of the rotor,
    wherein the rotor core defines:
        a plurality of permanent magnet insertion portions that extend through the rotor core in the axial direction, each of the plurality of permanent magnet insertion portions receiving one of the plurality of permanent magnets, wherein a d-axis extends in a radial direction of the rotor and passes between two of the plurality of permanent magnet insertion portions to thereby define a first core area and a second core area with respect to the d-axis, and
        at least one slot that extends through the rotor core and that is defined at the first core area such that a size of the first core area is less than a size of the second core area, the rotor being configured to rotate in a rotating direction from the second core area to the first core area, and
    wherein each of the magnetic poles is defined by two permanent magnets among the plurality of permanent magnets, the two permanent magnets comprising a first permanent magnet disposed in the first core area, and a second permanent magnet disposed in the second core area.

2. The electric motor of claim 1, wherein the plurality of permanent magnet insertion portions comprise:
    a first permanent magnet insertion portion that receives the first permanent magnet, the first permanent magnet insertion portion having a first inner side and a first outer side that are spaced apart from each other and extend parallel to each other; and
    a second permanent magnet insertion portion that receives the second permanent magnet, the second permanent magnet insertion portion having a second inner side and a second outer side that are spaced apart from each other and extend parallel to each other, and
    wherein the at least one slot comprises:
        a first side that is arranged parallel to the first outer side of the first permanent magnet insertion portion, and
        a second side that extends from the first side and is arranged parallel to the second outer side of the second permanent magnet insertion portion.

3. The electric motor of claim 2, wherein the at least one slot further comprises:
    a third side that is arranged radially outward relative to the first side and extends parallel to the first side in parallel, and
    a fourth side that is arranged radially outward relative to the second side and extends parallel to the second side.

4. The electric motor of claim 3, wherein a length of the third side is less than a length of the first side, and a length of the fourth side is less than a length of the second side, and wherein the at least one slot further comprises:
    a fifth side that extends from the third side and is arranged parallel to the second side, and
    a sixth side that extends from the fourth side and that is arranged parallel to the first side and connects to the fifth side.

5. The electric motor of claim 2, wherein the at least one slot further comprises:
    a third side that extends from an end portion of the second side and is arranged parallel to the first side, and
    a connection section that connects the first side and the third side to each other.

6. The electric motor of claim 2, wherein an area of the first permanent magnet insertion portion is greater than an area of the second permanent magnet insertion portion.

7. The electric motor of claim 6, wherein the first permanent magnet insertion portion comprises:
    a first flux barrier that extends along a lengthwise direction of the first permanent magnet; and
    a first expansion slot that extends from an end of the first permanent magnet insertion portion toward the d-axis, and
    wherein the second permanent magnet insertion portion comprises a second flux barrier that extends along a lengthwise direction of the second permanent magnet.

8. The electric motor of claim 7, wherein the second permanent magnet insertion portion further comprises a second expansion slot that extends from an end of the second permanent magnet insertion portion toward the d-axis.

9. The electric motor of claim 8, wherein an area of the first expansion slot is greater than an area of the second expansion slot.

10. The electric motor of claim 7, wherein the first expansion slot comprises:
    a first protruding portion that extends toward the d-axis by a first height with respect to the first outer side; and
    a second protruding portion that is disposed at a side of the first protruding portion and extends toward the d-axis by a second height with respect to the first outer side, the second height being less than the first height.

11. The electric motor of claim 2, wherein the at least one slot comprises a first slot defined in the first core area, and a second slot defined in the second core area.

12. The electric motor of claim 11, wherein each of the first slot and the second slot comprises:
    a first side that is arranged parallel to the first outer side of the first permanent magnet insertion portion; and
    a second side that extends from the first side and is arranged parallel to the second outer side of the second permanent magnet insertion portion.

13. The electric motor of claim 12, wherein the first slot further comprises:

a third side that extends from an end portion of the second side of the first slot and is arranged parallel to the first side of the first slot;

an arcuate section that extends from an end portion of the first side of the first slot and is arranged parallel to an outer circumference of the rotor core; and a connection section that connects the arcuate section and the third side to each other.

14. The electric motor of claim 12, wherein the second slot further comprises:

a third side that extends from an end portion of the second side of the second slot and is arranged parallel to the first side of the second slot; and a fourth side that extends from the third side and is arranged parallel to the first side of the second slot.

15. The electric motor of claim 12, wherein the at least one slot further comprises a central slot defined in an area between the first core area and the second core area.

16. The electric motor of claim 15, wherein the central slot comprises:

a first side that is arranged parallel to the first outer side of the first permanent magnet insertion portion;

a second side that extends from the first side of the central slot and is arranged parallel to the second outer side of the second permanent magnet insertion portion;

a third side that extends from an end portion of the first side of the central slot and is arranged parallel to the second side of the central slot; and a fourth side that extends from an end portion of the second side of the central slot and is arranged parallel to the first side of the central slot, the fourth side being connected to the third side.

17. The electric motor of claim 11, wherein the at least one slot further comprises a third slot defined in the first core area, the third slot being positioned between the first slot and the d-axis, wherein the first slot is defined at a position adjacent to an outer end region of the first permanent magnet, and wherein the second slot is defined at a position adjacent to an outer end region of the second permanent magnet.

18. The electric motor of claim 2, wherein the rotor core comprises an outer core part disposed between the first permanent magnet insertion portion and the second permanent magnet insertion portion, the d-axis passing through the outer core part and dividing the outer core part into the first core area and the second core area, wherein the first core area comprises a first outer part and a first inner part divided by a division line extending orthogonal to the d-axis, and the second core area comprises a second outer part and a second inner part divided by the division line, wherein the at least one slot is defined in at least one of the first outer part, the first inner part, the second outer part, or the second inner part such that a slot area of the first inner part is less than or equal to a slot area of the first outer part, a slot area of the second inner part is less than or equal to the slot area of the first inner part, and a slot area of the second outer part is less than or equal to the slot area of the second inner part.

19. A compressor comprising:

a case;

a compression unit disposed inside the case and configured to compress refrigerant; and an electric motor disposed inside the case and configured to apply driving force to the compression unit, the electric motor comprising:

a stator, and a rotor disposed in the stator and spaced apart from the stator by a preset gap, the rotor being configured to rotate with respect to the stator, wherein the rotor comprises:

a rotation shaft, a rotor core coupled to the rotation shaft, and a plurality of permanent magnets that are coupled to the rotor core and extend in an axial direction of the rotor, the plurality of permanent magnets defining magnetic poles along a circumferential direction of the rotor, wherein the rotor core defines:

a plurality of permanent magnet insertion portions that extend through the rotor core in the axial direction, each of the plurality of permanent magnet insertion portions receiving one of the plurality of permanent magnets, wherein a d-axis extends in a radial direction of the rotor and passes between two of the plurality of permanent magnet insertion portions to thereby define a first core area and a second core area with respect to the d-axis, and at least one slot that extends through the rotor core and that is defined at the first core area such that a size of the first core area is less than a size of the second core area, the rotor being configured to rotate in a rotating direction from the second core area to the first core area, and wherein each of the magnetic poles is defined by two permanent magnets among the plurality of permanent magnets, the two permanent magnets comprising a first permanent magnet disposed in the first core area, and a second permanent magnet disposed in the second core area.

* * * * *